(12) United States Patent
Niioka

(10) Patent No.: US 8,330,282 B2
(45) Date of Patent: Dec. 11, 2012

(54) MOTOR HORSE POWER AMPLIFICATION DEVICES USING A MOMENT ARM DESIGN

(76) Inventor: Yoshio Niioka, Ishino-Miya (JP)

( * ) Notice: Subject to any disclaimer, the term of this patent is extended or adjusted under 35 U.S.C. 154(b) by 0 days.

(21) Appl. No.: 12/707,794

(22) Filed: Feb. 18, 2010

(65) Prior Publication Data

US 2011/0179892 A1 Jul. 28, 2011

(30) Foreign Application Priority Data

Oct. 16, 2009 (JP) ................................ 2009-255506

(51) Int. Cl.
*F03D 5/04* (2006.01)
(52) U.S. Cl. ........................................ 290/1 R; 290/1 C
(58) Field of Classification Search .................. 290/1 R, 290/1 C; 74/25
See application file for complete search history.

(56) References Cited

U.S. PATENT DOCUMENTS

| 6,858,950 | B1 * | 2/2005 | Simon | 290/1 R |
| 7,151,322 | B2 * | 12/2006 | Eskandr | 290/1 R |
| 7,709,970 | B2 * | 5/2010 | Blevins | 290/1 R |
| 2004/0178634 | A1 * | 9/2004 | Eskandr | 290/1 R |
| 2005/0248159 | A1 * | 11/2005 | Seoane | 290/1 R |
| 2009/0051169 | A1 * | 2/2009 | Kostoff | 290/1 R |
| 2009/0179431 | A1 * | 7/2009 | Wilson et al. | 290/1 R |
| 2010/0237631 | A1 * | 9/2010 | Yu | 290/1 R |

* cited by examiner

*Primary Examiner* — Tho D Ta
(74) *Attorney, Agent, or Firm* — Procopio, Cory, Hargreaves & Savitch LLP; Scott H. Davison

(57) ABSTRACT

A motor horse power amplification device using a moment arm design is described. The device converts reciprocal motion of the moment arm to rotational motion which drives an electrical generator. Use of the device can significantly reduce the amount of electricity generated by power plants and thus reduce the need for power plant construction. The devices have many different applications, including home, industrial, and automotive applications.

13 Claims, 22 Drawing Sheets

Measurement data of a HP AMP Device

| Torque (Nm) | A<br>Output (HP) | B<br>RPM (rpm) |
|---|---|---|
| 2 | 0.57343 | 2050 |
| 17 | 4.76713 | 2005 |
| 22 | 6.09231 | 1980 |
| 38 | 10.12979 | 1906 |
| 51 | 13.19580 | 1850 |
| 63 | 15.99231 | 1815 |

A : Graph of the Output in(HP) and Torque in(Nm)
B : Graph of the RPM(rpm)
Input motor is 3HP Generator Power Output Test Data

| LOAD | CURRENT | POWER |
|---|---|---|
| R(Ω) | I(A) | W(KW) |
| 16.67 | 12 | 2.400 |
| 8.33 | 24 | 4.800 |
| 5.56 | 36 | 7.200 |

NOTE:

1. The driving motor is 3 HP. Power input is 3 HP × 0.75 KW = 2.25 KW
2. The Generator output voltage is 200 V.
3. Electric Power Amplification ratio = 7.2 KW ÷ 2.25 KW = 3.2 Times
4. 7.2 KW ÷ 0.75 KW = 9.6 HP (Generator HP)
   9.6 HP × 1.7 = 16.32 HP (Generator HP convert back to motor HP)
   HP Amplification Ratio = 16.32 HP ÷ 3HP = 5.44 Times

MOTOR HORSE POWER AMPLIFICATION DEVICES USING A MOMENT ARM DESIGN

RELATED APPLICATIONS

This application claims priority to Niioka, Japanese application 2009-255506, filed Oct. 16, 2009, which is incorporated herein by reference in its entirety, including drawings.

FIELD OF THE INVENTION

The present invention relates electrical power generation and the reduction of fossil fuel usage.

BACKGROUND OF THE INVENTION

The following discussion is provided solely to assist the understanding of the reader, and does not constitute an admission that any of the information discussed or references cited constitute prior art to the present invention.

A general scientific acceptance is developing that an observed global warming trend is caused, at least in part, by releases of greenhouse gases into the atmosphere from human-caused sources. Major components of those human-caused or anthropogenic sources are exhaust gases from burning of fossil fuels such as gasoline, diesel, and coal. Much of such fossil fuel burning is due to generation of electrical power (e.g., burning of coal in power generating stations) and to transportation needs (e.g., burning of gasoline and diesel in cars, trucks, busses, and the like).

Therefore, it would be of great benefit to reduce the usage of fossil fuels and thereby reduce the release of greenhouse gasses. This would also contribute to lower energy costs.

SUMMARY OF THE INVENTION

It is widely accepted that the world is in the midst of global warming crisis, caused in significant part by release of antropogenic greenhouse gases, especially carbon dioxide ($CO2$). A large portion of that $CO2$ release is due to industrial sources (primarily from burning the fossil fuel) such as for electrical power generation, as well as from burning of fossil fuels in transportation vehicles (e.g., cars, truck, etc.) The present invention addresses this issue by providing a power amplification device.

Thus, the invention provides a moment arm power amplification device. The device uses at least one motor-driven moment arm (and often two moment arms) which moves in reciprocating motion through an arc. The moment arm pivots about a pivot point proximal to one end of the moment arm and thereby pivots a rocker drive mounted thereon. The motor drives the moment arm through a linkage distal to the pivot point and distal to the rocker drive. The device also includes a set of reciprocating to rotating motion converting units rotationally linked with the rocker drive and including a pair of opposing direction one-way clutches (e.g., ratchets) coupled respectively to a forward rotating drive and a reversing rotating drive such that the output from the forward rotating drive and reversing rotating drive rotate in the same direction. The device further includes a flywheel rotationally coupled with the forward rotating drive and reversing rotating drive, and a generator rotationally coupled with the forward rotating drive and reversing rotating drive and the flywheel. Rotation of the generator generates electricity.

In this system, the reciprocating motion of the moment arm is converted to single direction rotation of the flywheel and the generator. The flywheel is beneficial to maintain rotational momentum and smooth out the drive impulses from the reciprocating motion of the moment arms.

The device can be constructed in a variety of ways. A number of designs are described in the Detailed Description.

Additional embodiments will be apparent from the Detailed Description and from the claims.

DETAILED DESCRIPTION OF THE PREFERRED EMBODIMENTS

Figure 1:
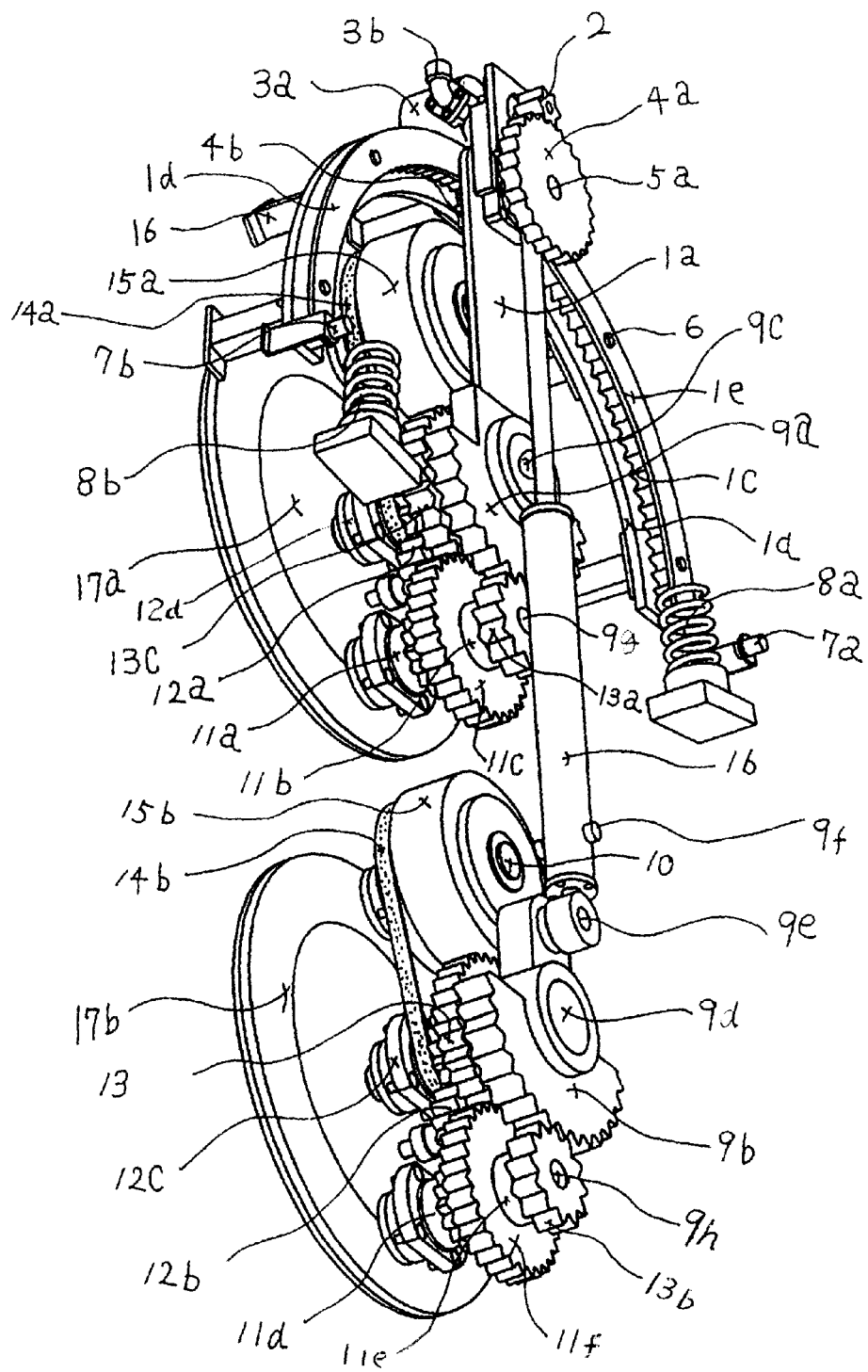
FIG. 1 is a diagram illustrating a layout drawing of a HP AMP Design-1 device using two moment arms and two generators.
Figure 2:
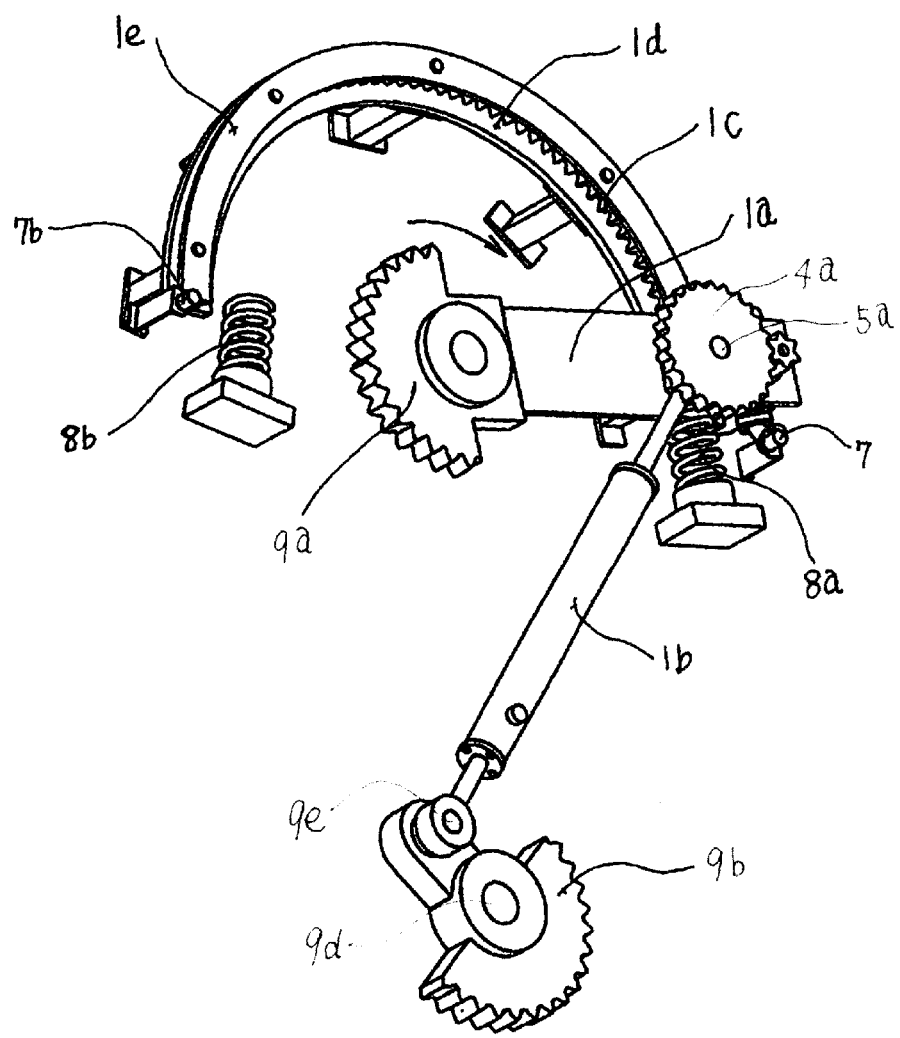
FIG. 2 is a diagram illustrating an arrow showing the parallel left to right movement of the No. 1 moment arm (1a) and the No. 2 moment arm (1b).
Figure 3:
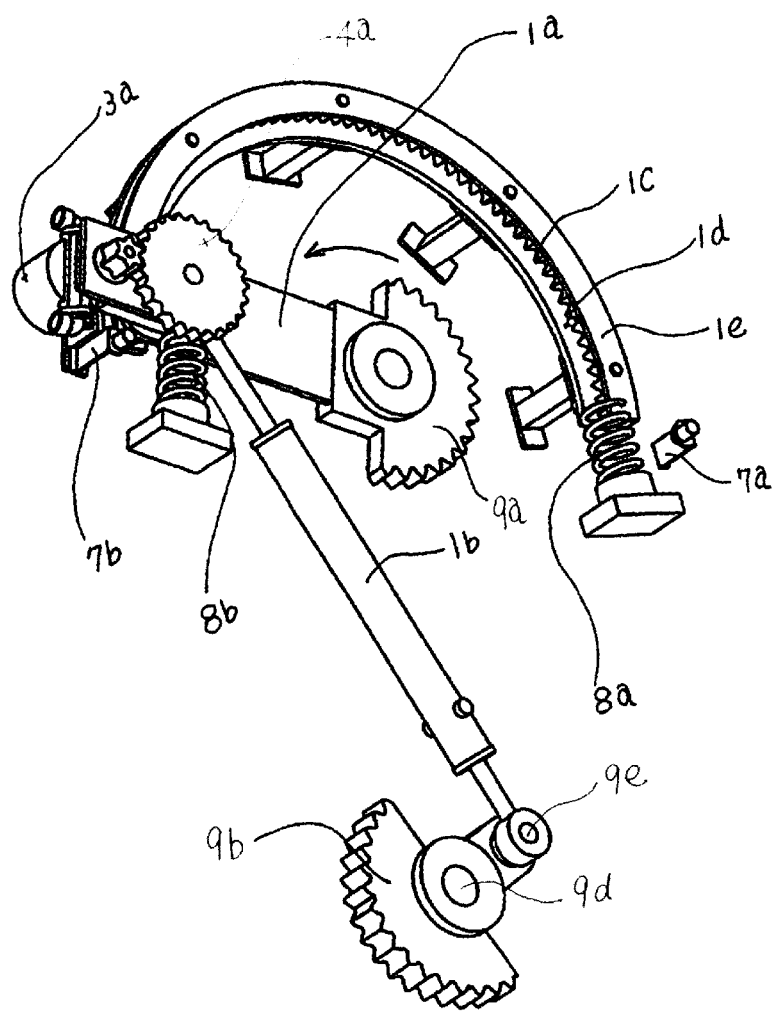
FIG. 3 is a diagram illustrating both the No. 1 moment arm (1a) and the No. 2 moment arm (1b) are installed with the inner gear (1c) and moving in parallel round trip motion.
Figure 4:
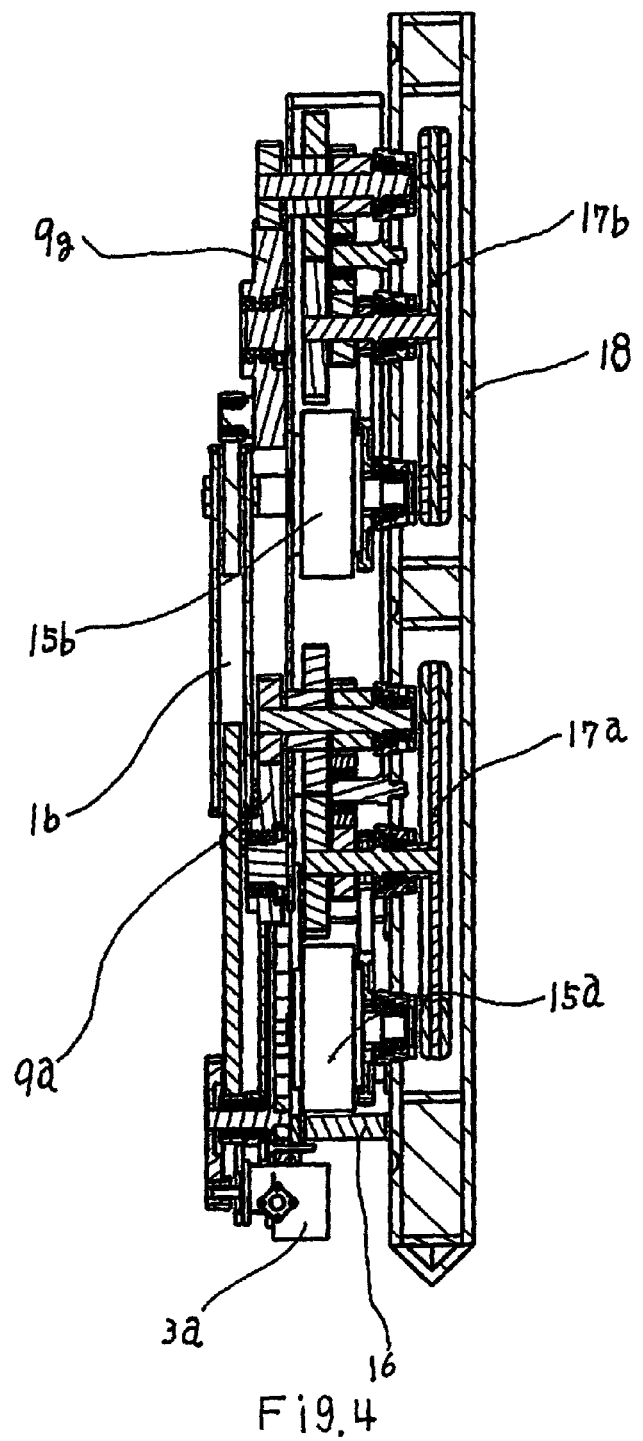
FIG. 4 is a diagram illustrating a sectional view of a HP AMP Design-1 device using a moment arm design.

To generate electricity, a great deal of oil and coal are currently being used. When oil or coal is burned a tremendous amount of carbon dioxide ($CO_2$) is discharged to the atmosphere. This invention provides a device which will amplify the motor horse power to such an extent that the motor can rotate a much bigger generator to generate much more electricity than without this device. The electric amplification between the generator and the motor is about 3 to 6 times to 1.

With HP AMP Design-1 and HP AMP Design-4 described below, one motor can drive two moment arm HP amplification mechanisms, which in turn will drive two generators. With two generators, the device will produce about 6 times more electric power than the motor input power. When using the HP AMP Design-2, HP AMP Design-3, or HP AMP Design-5 the one motor only drives one moment arm HP amplification mechanism, therefore, the moment arm HP amplification mechanism can only drive one generator and the electric power is only amplified up to about 3 times of the motor input power. Therefore, using these devices, the need of electric power from the power plants will be drastically reduced. That in turn will cut down the $CO_2$ pollution to the atmosphere.

Thus, as just indicated, this invention uses the moment arm design to amplify the horse power of a motor so a much larger electric generator can be rotated to produce more electric power than the electric power needed to rotate the motor.

This device can be used at factories, vehicles, ships; air planes electric generators, construction machinery, etc. to reduce their demand for electric power. This invention can also reduce the carbon dioxide emitting to the atmosphere, because the need of electric power is reduced. We expect this invention can reduce 50% or more of the carbon dioxide to the atmosphere.

With this invention, the generator output power will be increased by approximately 3 or 6 times that of input power to rotate the motor. Each family and industry using this device will save significantly on electric bills and consequently, the power plants will require less oil or coal than before. That in turn will reduce the carbon dioxide pollution to the atmosphere substantially.

The invention and embodiments thereof for using a moment arm device to amplify the motor horse power will be understood more fully from the detailed description given below and from the accompanying drawings, which, however, should not be taken to limit the method and system to a specific embodiment, but are for explanation and understanding only.

For this invention, five distinct embodiments or ways to design motor horse power amplification (HP AMP) devices using moment arm design are illustrated in the drawings. They are called HP AMP Design-1, HP AMP Design-2, HP AMP Design-3, HP AMP Design-4, and HP AMP Design-5.

HP AMP Design-1

As shown in FIG. 1, the HP AMP Design-1 uses one driving motor (3a) to drive No. 1 moment arm (1a) with its HP amplification mechanism to amplify the motor horse power (in this embodiment about 5.1 times). The output side of the HP amplification mechanism uses a belt (14a) to drive the generator (15a). Of course, in places where belt drives are described, other drives can also be used, e.g., gear drive or chain and sprocket drives. In the meantime the same motor (1a) also drives the No. 2 moment arm (1b) with its HP amplification mechanism to amplify the motor horse power 5.1 times also. The output side of the HP amplification mechanism uses a belt (14b) to drive a generator (15b). For instance a 3 horse power (HP) motor is used to drive the two moment arm HP amplification mechanisms. Output of each moment arm HP amplification mechanism will be amplified to 5.1 time of the driving motor HP or 3 HP×5.1=15.3 HP.

Due to the electromagnetic nature of the generator design, the generator horse power is lower than the motor by a factor of about 1.7. Therefore, the generator HP is:

15.3 HP/1.7=9 HP.

9 HP×0.75 KW=6.75 KW (Electric power output from a generator)

The input power to a 3 HP motor is 3 HP×0.75 KW=2.25 KW

The electric amplification factor is: 6.75 KW/2.25 KW=3

This means that this HP AMP Design-1 will amplify the motor HP by 5.1 times and amplify the generator electric power by 3 times for each generator.

Since the Design-1 drives two moment arm HP amplification mechanisms to drive two generators, therefore, the total electrical amplification factor is:

3×2=6 If using the actual figures, 6.75 KW×2=13.5 KW 13.5 KW/2.25 KW=6 (the total electric amplification factor is 6)

2.25 KW/13.5 KW×100%=17% (Power used for driving the motor)

100%−17%=83% (Power saved by using the HP AMP Design-1)

Figure 5:
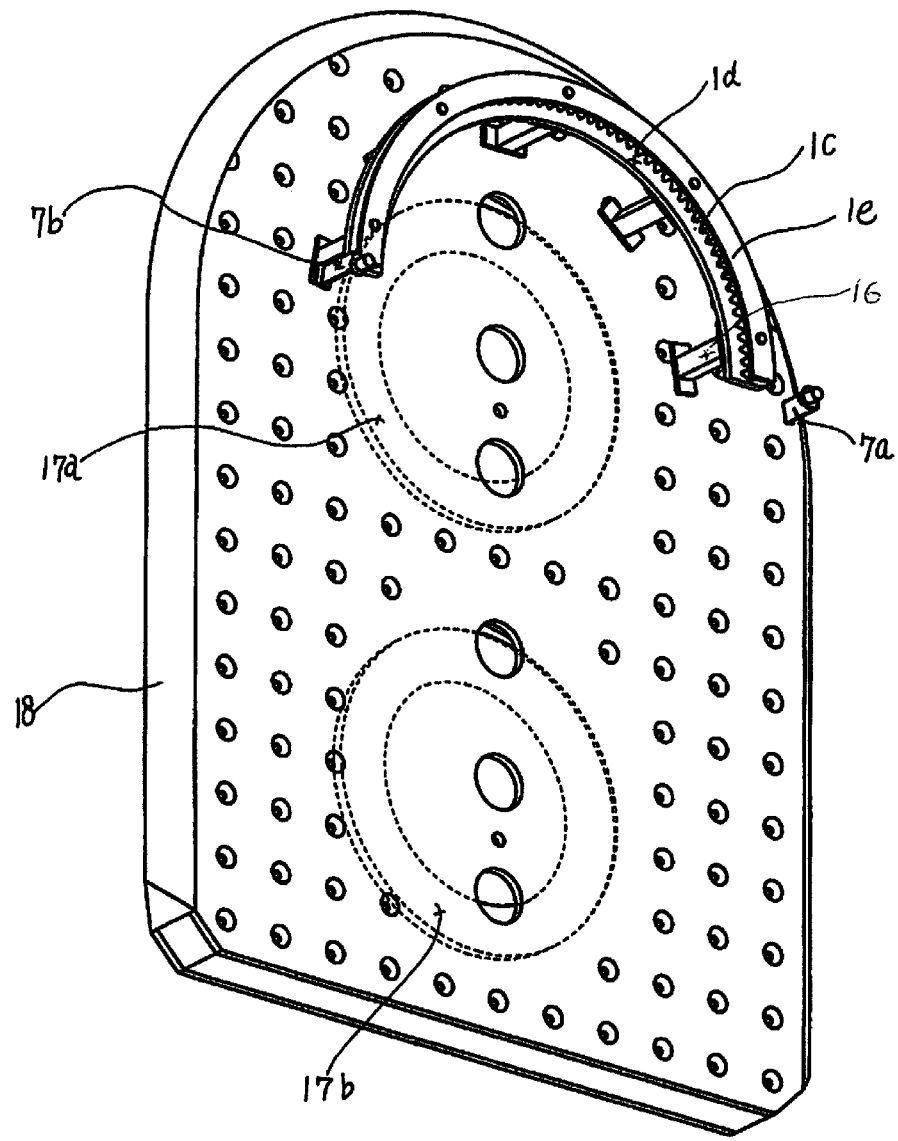
FIG. 5 is a diagram depicting a total view of a lower frame panel (18) made of a metal square sandwich frame panel (91) and with a inner gear (1c), a lower parallel round trip motion gear restraining panel (1d), an upper parallel round trip motion gear restraining panel (1e), parallel round trip motion switching limit switch (7b) and the inner gear main body attachment posts (16).

As shown in FIG. 5, a frame panel (18) is built first, so all the parts for the HP AMP Design-1 can be assembled on the panel (18). The size of the bottom frame panel (18) for this embodiment is 1800 mm in length by 900 mm in width and 120 mm in height.

As shown in FIG. 1, a parallel round trip motion inner gear (1c) (i.e., a reciprocating motion inner gear, which in this case is a fixed curved reciprocating gear) is fixed to the fixture post (16) by an inner gear installation bolt (6). The No. 1 moment arm (1a) is installed with the support shaft (9c), a parallel round trip motion (i.e., reciprocating motion) to rotation motion speed increase gear (13c), a bearing (12c), and a flywheel (17a). A parallel round trip motion speed control gear (4a), a parallel round trip motion speed control gear shaft (5a), a top portion bearing (5b) of the No. 2 moment arm (1b), and a parallel round trip motion drive gear (4b) are also installed to the No. 1 moment arm (1a).

In this embodiment, an oil pressure driving motor (3a) is installed at the top of the No. 1 moment arm (1a) and the motor uses the oil pressure to drive the parallel round trip motion input power rotating gear (2). An oil pressure rubber hose attachment nozzle (3b) is installed by the motor (3a). The rotation of the parallel round trip motion input power rotating gear (2) rotates the parallel round trip motion control gear (4a) and which in turn will rotate the parallel round trip motion drive gear (4b) to move from left to right in a parallel round trip fashion (that is, a reciprocating motion following along the curved gear in reciprocating arc motion).

The upper and lower parallel round trip motion inner gear restraining panels (1d) and (1e) are used to prevent the inner gear (1c) and the parallel round trip motion drive gear (4b) from slipping out and in addition some inner gear main body fixture posts (16) are installed. In this illustrative design six posts are installed.

Two parallel round trip motion speed amplification springs (8a) and (8b) (also referred to as reversing assist springs) are installed to the inner gear assembly (1f), and they are fixed to both sides of the posts (16). The installation of these two parallel round trip (reciprocating) motion speed amplification springs (8a) and (8b) not only will ease the impact energy they also can increase the parallel round trip motion energy by 10%.

The parallel round trip motion of the moment arm is controlled by the switching limit switches (7a) and (7b) through an electrical signal. The electrical signal switches the motor to change the rotation direction from clockwise to counter-clockwise or vice verse. This change of the motor rotation direction will change the parallel round trip motion (i.e., reciprocating motion) from right to left or vice verse.

The parallel round trip motion to rotation motion switching gears (9a) and (9b) (i.e., reciprocating to rotating motion converting gears) are installed on the No. 1 moment arm (1a) and No. 2 moment arm (1b) and fixed by the supporting shafts (9c), (9d) and bearings (12c) and (12d). The No. 2 moment arm is fixed by the No. 2 moment arm supporting shaft (9f) with one side by the parallel round trip motion speed control gear shaft (5a) and the other side by the crank supporting shaft (9e). Two generators (15a) and (15b) are installed with the generator installation shaft (10). The No. 1 moment arm (1a) and No. 2 moment arm (1b) will move in a parallel round trip motion (reciprocating motion). The parallel round trip motion to rotating motion switching gears (9a) and (9b) are interlocked together with the parallel round trip motion to rotating motion input gears (13a) and (13b) but they will be controlled by the one way clutches (11a), (11b), (11c), (11d), (11e) and (11f) to only rotate one way. By doing so, the parallel left to right movement of the No. 1 moment arm (1a) and the No. 2 moment arm (1b) are controlled by more than two one-way clutches to rotate only one way. These one-way clutch speed increasing gears (11a), (11b), (11c), (11d) (11e) and (11f) are installed with the support shafts (9g) and (9h). The flywheels (17a) and (17b) are rotated by the idle gears (12a) and (12b), and the parallel round trip motion to rotating motion input gears (13a) and (13b). The generators (15a) and (15b) are rotated by the generator driving belts (14a) and (14b) through the HP amplification mechanism of the No. 1 moment arm (1a) and the No. 2 moment arm (1b) to generate the electricity. Thus, the overall operation of the unit (as well as the other designs described herein) involves the conversion of the reciprocating motion of the moment arms to a unidirectional rotational motion of the flywheel drive and flywheel, as well as the generator drive and generator. In the described embodiments, the conversion of reciprocating motion (i.e., the reciprocating pivoting motion of the moment arms) is transferred to downstream rotation motion using a rocker drive. That is, the movement of the pivot end of the moment arm couples with an output gear or shaft to impart an impulse with each cycle of reciprocating movement of the moment arm, e.g, the "rocking" motion of the moment arm. In the case of this Design 1 (and related designs), the rocker drive functions through a terminal arc or rocker gear on the end of the moment arm which is engaged with a gear and one-way clutch assembly which converts the reciprocating or rocking motion to unidirectional motion of an output shaft, while in Design-3 described below, the rocker drive functions through a one-way clutch (e.g., a ratchet mechanism) in the end of the moment arm.

In summary, the HP AMP, Design-1 uses one motor to drive two moment arm HP amplification mechanisms and each moment arm HP amplification mechanism drives one generator. A moment arm HP amplification mechanism will amplify the motor HP by about 5.1 times and which in turn will drive a generator to generate about 3 times more electric power than the motor input power. With two generators in the HP AMP Design-1, the total electric power output will be about 6 times the driving motor electric power received. The power saved by using the HP AMP Design-1 is about 83%. If two units are connected together in series, it will multiply the electric power by 1×6×6=36 times. The factories, commercial buildings, shopping centers, etc. can use this arrangement and save 97% electric bill.

For instance, if we use a 50 HP motor to drive the first stage unit, the motor input power will be:

50 HP×0.75 KW=37.5 KW.

50 HP×5.1=255 HP

255 HP/1.7=150 HP (motor HP converted to generator HP)

150 HP×0.75 KW=112.5 KW (one generator power output)

112.5 KW×2=225 KW (Two generators connected in parallel)

225 KW/37.5 KW=6 times (The output power is 6 times of input power)

225 KW/0.75 KW=300 HP (Unit-2 motor horse power)

300 HP×5.1=1530 HP (Motor HP amplified 5.1 times)

1530 HP/1.7=900 HP (Motor HP converted to generator HP)

900 HP×0.75 KW=675 KW (One generator power output)

675 KW×2=1350 KW (Two generators connected parallel)

1350 KW/37.5 KW=36 (The unit-2 generator output is 36 times of unit-1 motor power input)=1×6× 6=36

37.5 KW/1350 KW×100%=2.8%=3%.

100%−3%=97% (97% saving of electric bill)

The benefits of using the HP AMP Design-1 for the personal families are:
(A) The need of importing the foreign oil will be drastically reduced, because all the families in the US will use about 83% less electricity in their houses.
(B) Because we will not need more electric power plants to be built, therefore, the energy-related emissions, including the green-house gases (CO2) will be drastically reduced.
(C) Since each family can save more than 80% of their monthly electric bill, the financial condition of the families will be improved which in turn will improve the economic situation nationwide and worldwide.

The benefits for using the HP AMP Design-1 for every factory and commercial building are:
(A) Each factory and commercial building will use 97% less electricity than before, which will cut down the need to purchase more foreign oil.
(B) Because we will not need more electric power plants to be built, therefore, the energy-related emissions, including the green-house gases (CO2) will be drastically reduced.
(C) Since each factory and commercial building will save 97% of their monthly electric bill, the financial condition of the factory and commercial building operator will be improved which in turn will improve the economical situation nationwide and worldwide.

HP AMP Design-2

Figure 6:
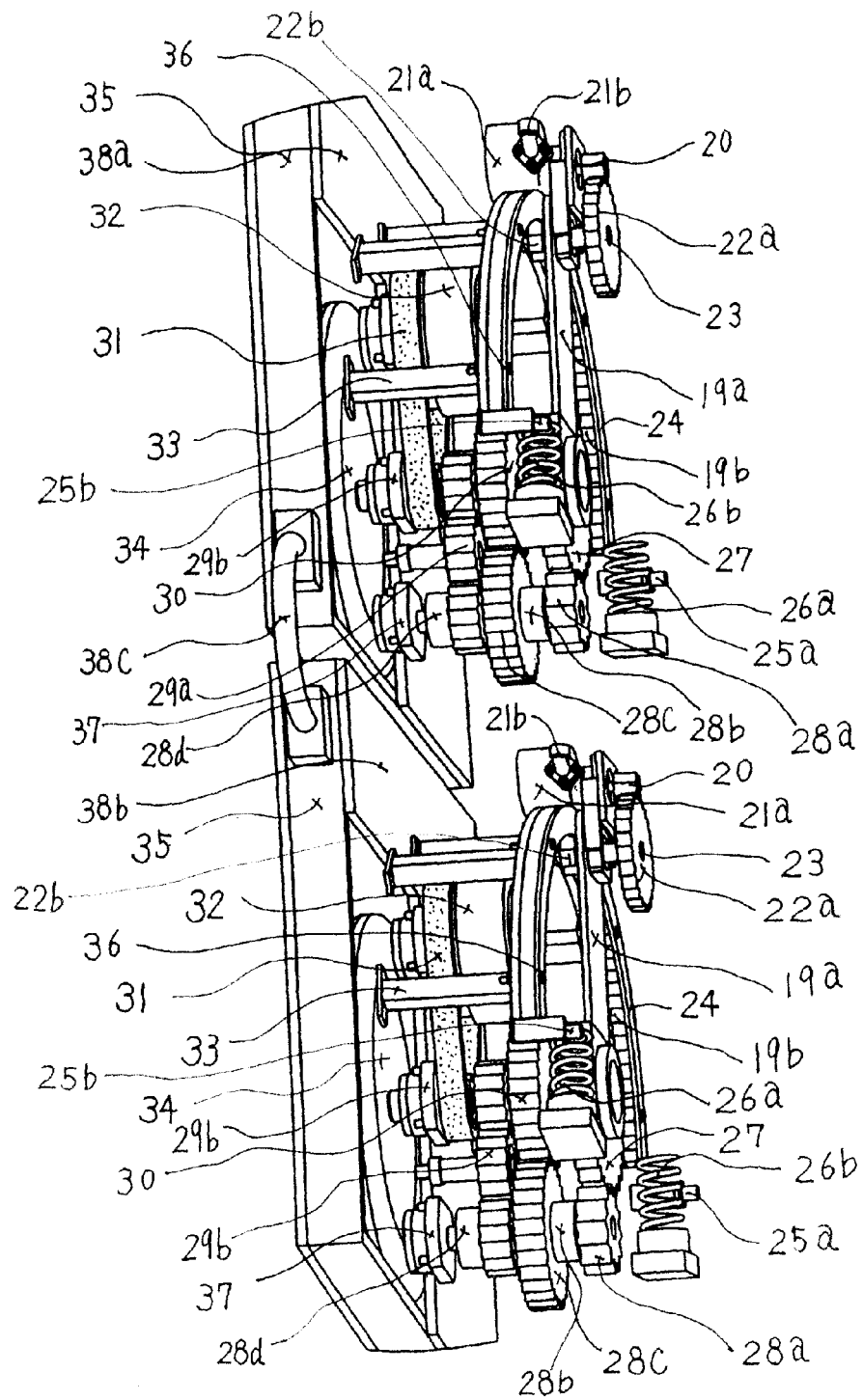
FIG. 6 is a diagram illustrating a HP AMP Design-2, unit-1 and a HP AMP Design-2, unit-2 connected in series electrically. Both units have only one moment arm and one generator.

As shown in FIG. 6, the HP AMP Design-2 is very similar to the HP AMP Design-1. The principal difference is that the HP AMP Design-2 uses one motor (21a) to drive only one moment arm (19a), with its HP amplification mechanism, while the HP AMP Design-1 uses one driving motor to drive two moment arms with their HP amplification mechanisms. The moment arm with its HP amplification mechanism will amplify motor HP 5.1 times to drive an electric generator (32), as with the HP AMP Design-1. The generator will output 3 times the electric power compared to the driving motor input power, which is also the same as the HP AMP Design-1.

FIG. 6 shows that two HP AMP Design-2, unit-1 (38a) and unit-2 (38b) are connected in series by an electrical cable and connection pipe (38c). By doing so, the electric power from the HP AMP Design-2, unit-1 generator (32) is fed to the HP AMP Design-2, unit-2 driving motor (21a). The electric power from the unit-1 generator is 2.25 KW×3=6.75 KW.

In this case the unit-2 motor will be 6.75 KW/0.75 KW=9 HP

9 HP×5.1=45.9 HP (Unit-2 motor HP amplified)

45.9 HP/1.7=27 HP (motor HP converted to generator HP)

27 HP×0.75 KW=20.25 KW (Unit-2 generator electric power output)

20.25 KW/2.25 KW=9 times. (unit-2 generator electric power output is 9 time of unit-1 motor input power.)

Each HP AMP Design-2 will amplify the electrical power 3 times. When each unit is added in series it will multiply the electrical power 3 times. Thus, as shown in FIG. 6 two units connected in series will make it 1×3×3=9 times. If a third unit is added it will multiply 1×3×3×3=27 times.

As shown in FIG. 6, a frame panel main body (35) is built first, so all the parts for the HP SMP Design-2 can be assembled on the frame panel main body (35). The size of the frame panel main body (35) is 1000 mm in length by 900 mm in width and 120 mm in height.

As shown in FIG. 6, a parallel round trip motion inner gear assembly (24) containing the inner gear (19b) is fixed to the fixture post (33) by an inner gear installation bolt (36). The moment arm (19a) is installed and a generator rotation speed increasing gear (30), a bearing (29b), and a flywheel (34) are also installed. In addition, two parallel round trip motion to rotating motion input power gears (28a) and (28c) and two one way clutches (28b) and (28d) with a bearing (37) are installed. A parallel round trip motion speed control gear (22), and a parallel round trip motion speed control gear shaft (23) are also installed to the moment arm (19a).

An oil pressure driving motor (21a) is installed at the top of the moment arm (19a) and the motor uses the oil pressure to drive the parallel round trip motion input power rotating gear (20). An oil pressure rubber hose attachment nozzle (21b) is installed next to the motor (21a). The rotation of the parallel round trip motion input power rotating gear (20) rotates the parallel round trip motion control gear (22a) and which in turn will rotate the parallel round trip motion drive gear (22b) to move from left to right in a parallel round trip fashion.

Two parallel round trip motion speed amplification springs (26a) and (26b) are installed to the inner gear assembly (24), and they are fixed to both sides of the posts (33). The installation of these two parallel round trip motion speed amplification springs (26a) and (26b) not only will ease the impact energy they also can increase the parallel round trip motion energy by 10%.

The parallel round trip motion of the moment arm is controlled by the parallel round trip motion switching limit switches (25a) and (25b) through an electrical signal.

The parallel round trip motion to rotating motion switching gear (27) is installed on the moment arm (19a). A generator (32) is installed. The moment arm (19a) will move in a parallel round trip motion. The parallel round trip motion to rotating motion switching gears (27) is interlocked together with the parallel round trip motion to rotating motion input gears (28a) and (28c) but they will be controlled by the one way clutches (28b) and (28d) to only rotate one way. By doing so, the parallel left to right movement of the moment arm (19a) is controlled by two one way clutches to rotate only one way.

The flywheel (34) is rotated by the idle gears (29a) and the parallel round trip motion to rotating motion input gears (28a). The generator (32) is rotated by the generator driving belts (31) through the HP amplification mechanism of the moment arm (19a) to generate the electricity.

HP AMP Design-3

Figure 7A:
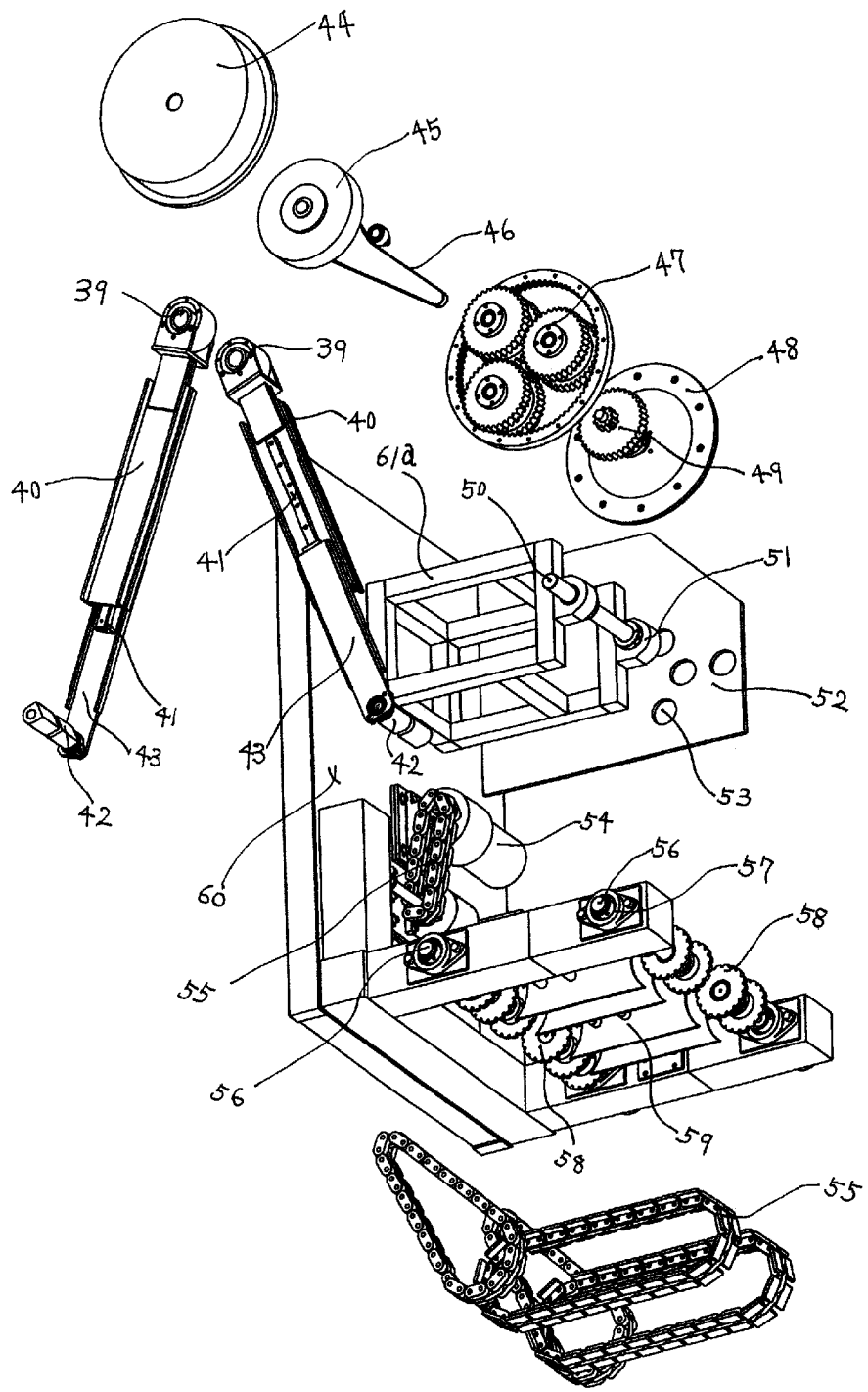
FIG. 7A is a diagram depicting all the parts to form a HP AMP Design-3 device before they are assembled.
Figure 7B:
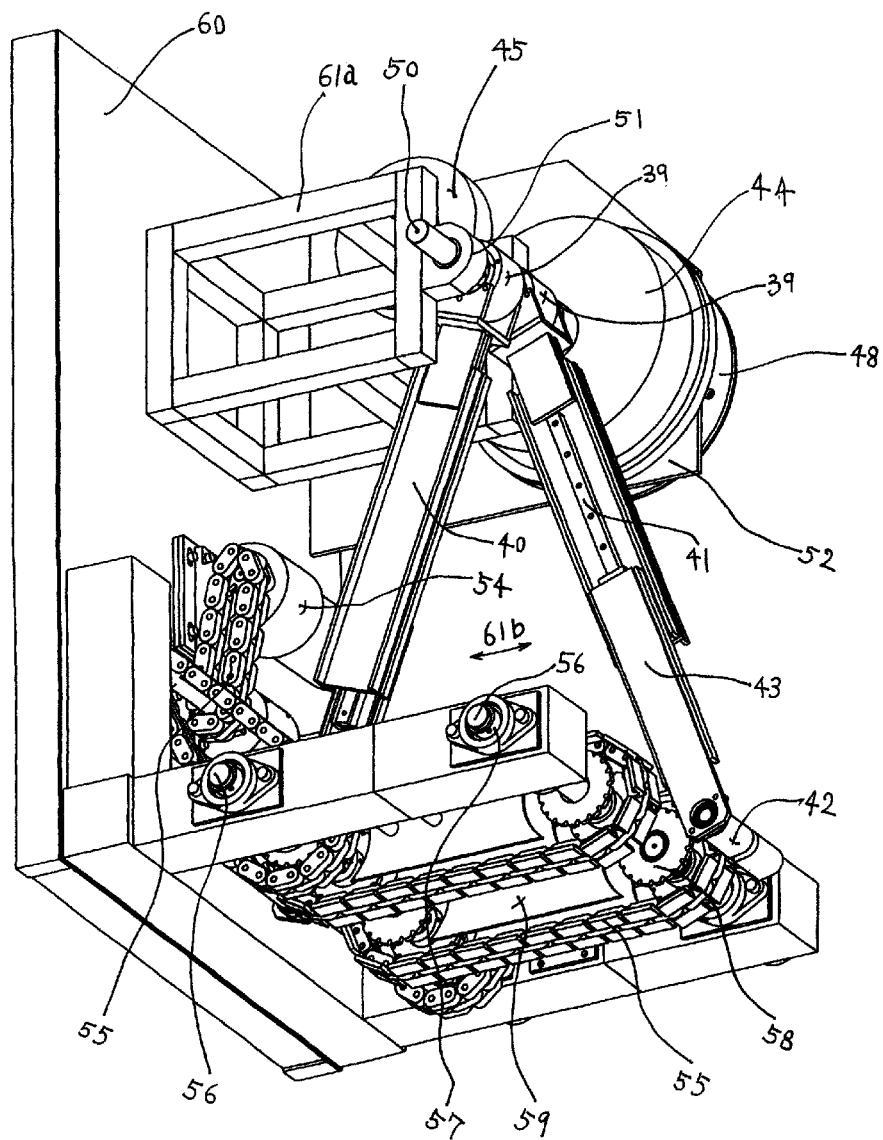
FIG. 7B is a diagram illustrating a completely assembled HP AMP Design-3 device.

As shown in FIGS. 7A and 7B, the HP AMP Design-3 differs from that of HP AMP Design-1, or HP AMP Design-2. It uses a chain to provide the rotational power to the amplification mechanism.

First, in this exemplary system, a metal square sandwich frame panel (60) with the size of 1800 mm in length, 900 mm in width, and 120 mm in thickness with upper steel in 4.2 mm thickness is constructed to install all the parts needed for the HP AMP Design-3 shown in FIG. 7A.

On the top portion of this panel, a generator (45), flywheel (48), remote gear (44), one way clutch (39), flywheel setting bearing (51), and a flywheel rotating shaft (50) with a bearing setting panel (52) are installed on the frame (61a). On the bearing setting panel (52), some remote gear setting holes (53) are made to install the remote gear (53). Then the frame (61a) is fixed onto the panel (60). Between shaft (50) and the flywheel (48) there is a pulley (46a), and the generator rotating belt (46b) is connected to the pulley (46a) then to the generator (45). Two moment arms (40) are then installed to the moment arm up and down motion driving motor (54).

Four 50 mm diameter with 500 mm length driving shafts (56) are installed with 8 shaft setting bearings (57). Eight 200 mm diameter chain rotation up and down motion sprockets (58) are installed to stabilize the moving chain (55). After a long period of use, the chain can be lengthened or stretched. In order to adjust the lengthened chain, there are four chain tension adjustment panels (59) installed to adjust the tension of the moving chain (55). The rotation speed of the moment arm up and down motion driving motor (54) are set at 1850 rpm to move both moment arms (40), up and down motion chain connection shaft (42), and the driving chain (55) to make the moment arms perform up and down motion 120 times a minute. The slide rail installation arm (43) provides the moment arm (40) its up and down movement. The movement is passed on to the one way clutch (39) and the slide guide rail (41) will adjust the angle and the extension/shrinking motion when they are rotating. The rotational speed is further controlled by a remote gear (44) in a remote gear assembly (47) and the flywheel speed increasing gear (49). The rotational speed of the flywheel (48) is set at 2800 to 3000 rpm and the rotational speed for the generator (45) is set at 1800 to 2000 rpm. An arrow (61*b*) on the FIG. 7B shows the moment arm movement direction. The driving motor horse power is 3 HP and the moment arm torque output is 63 Newton-meter (Nm). This HP AMP Design-3 can be easily produced with low cost.

HP AMP Design-4

Figure 8A:
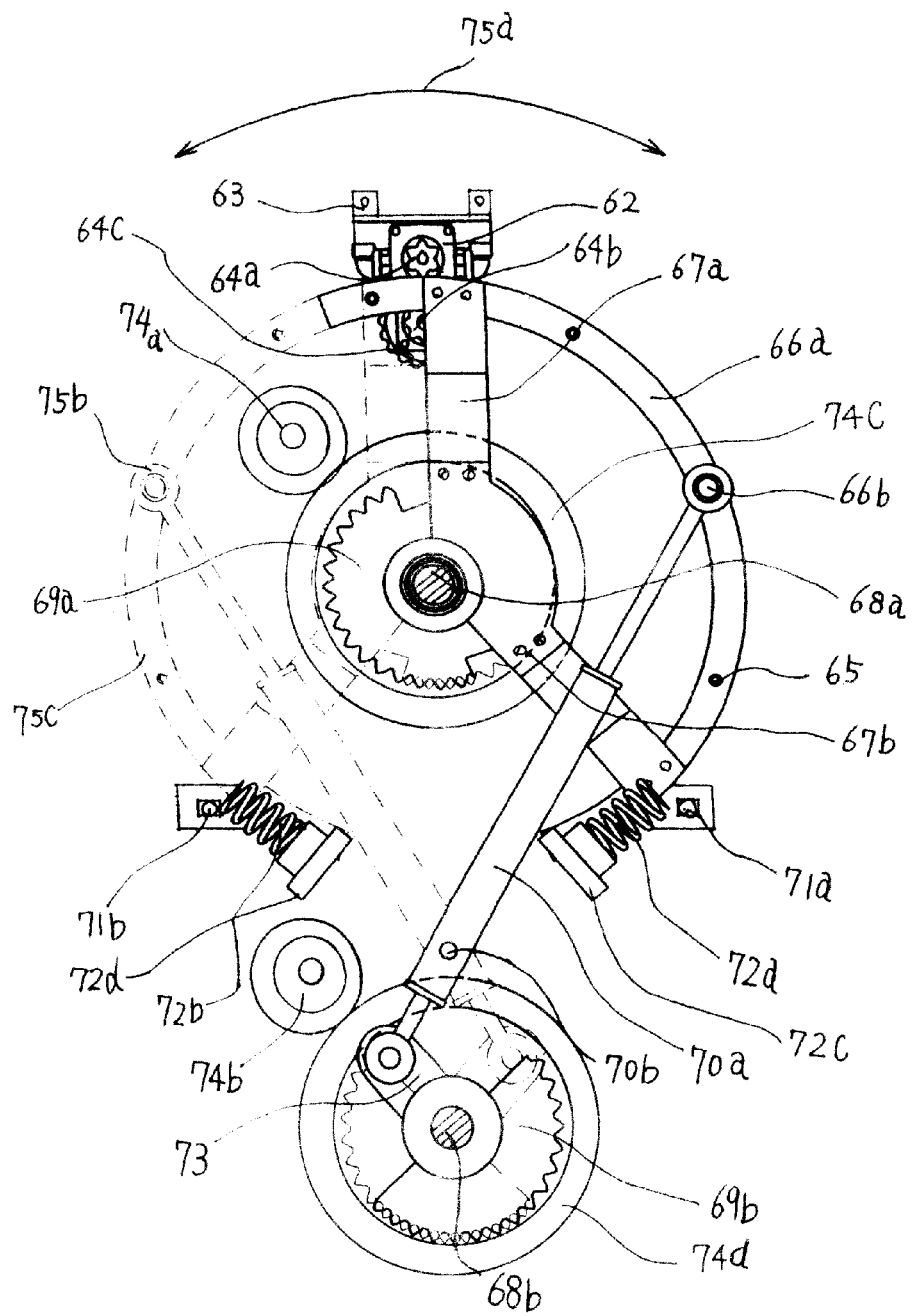
FIG. 8A is a diagram illustrating a HP AMP Design-4 device which move the inner gear assembly (66a) with two moment arms (67a) and (70a) and two generators (74a) and (74b).
Figure 8B:
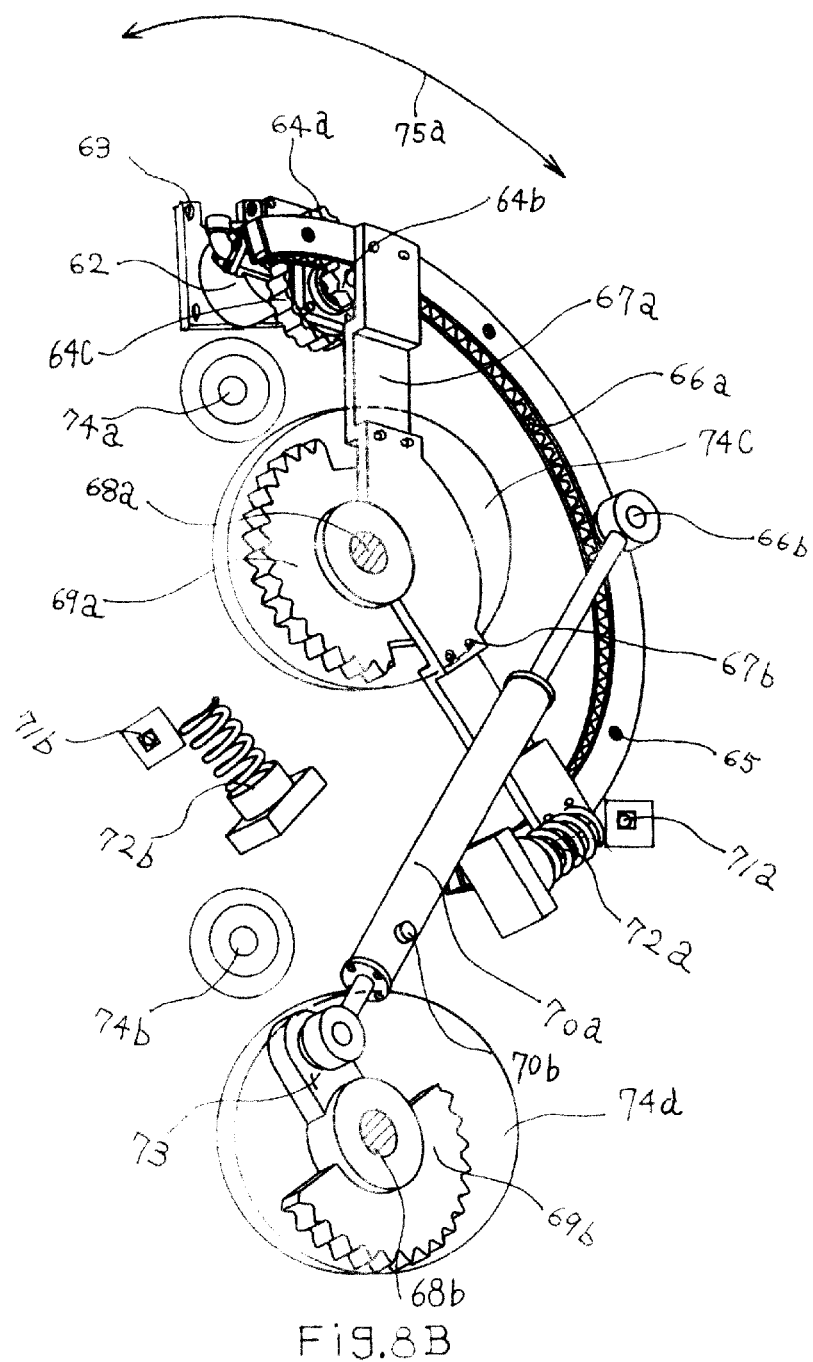
FIG. 8B is a diagram illustrating a slanting view of a HP AMP Design-4 devices.

As shown in FIG. 8A, the HP AMP Design-4 is very similar to the HP AMP Design-1 shown in FIG. 1. The HP AMP Design-4 also uses one driving motor (62) to drive two moment arms (67*a*) and (70*a*) with their HP amplification mechanisms to drive two generators (74*a*) and (74*b*). The motor HP amplification factor is the same 5.1 times and the generator electric power amplification factor is the same 3 times for each generator or 6 times total.

The major difference between the HP AMP Design-4 and the HP AMP Design-1 is the inner gear assembly (66*a*) in the HP AMP Design-4 moves in a parallel round trip motion while with HP AMP Design-1; the inner gear assembly (1*f*) is stationary. In HP AMP Design-4 the inner gear assembly (66*a*) moves in a parallel round trip motion with both moment arms (67*a*) and (70*a*) following the inner gear assembly (66*a*) to also move with it in a parallel round trip motion. Another difference between the HP AMP Design-4 and the HP AMP Design-1 is on the No. 1 moment arm design. The HP AMP Design-1 No. 1 moment arm (1*a*) is using a straight bar shaped moment arm while the HP AMP Design-4 No. 1 moment arm (67*a*) uses a W shaped moment arm. The benefit of this design is when the HP AMP Design-4 is operating; the noise is quieter than the HP AMP Design-1.

As shown in FIG. 8A, a driving motor (62) is installed to the driving motor installation bracket (63). The inner gear assembly (66*a*) is assembled by the inner gear installation bolt (65). The driving motor (62) will drive the inner gear parallel round trip movement gears (64*a*) and (64*b*), which in turn will drive the speed control gear (64*c*) to control the speed. The No. 1 W shaped moment arm (67*a*) is assembled with the W shaped moment arm installation bolts (67*b*). The parallel round trip motion to rotating motion switching gear (69*a*) and a flywheel (74*c*) are installed on the No. 1 W shaped moment arm (67*a*) and fixed by the supporting shaft (68*a*). In order to make the inner gear assembly (66*a*) to make parallel round trip motion, the No. 1 W shaped moment arm (67*a*) is installed by the supporting shaft (68*a*). Similarly, the parallel round trip motion to rotating motion switching gear (69*b*) and a flywheel (74*d*) are installed on the No. 2 moment arm (70*a*) and fixed by the supporting shaft (68*b*). Making the No. 1 W shaped moment arm (67*a*) as the center, the No. 2 extendable cylinder moment arm (70*a*) is installed with the No. 2 moment arm installation bearing and shaft (66*b*), and the supporting shaft (68*b*), No. 2 extendable cylinder moment arm supporting shaft (70*b*) and the No. 2 moment arm parallel round trip motion crank (73) to rotate the generators (74*a*) and (74*b*). The parallel round trip motion of the inner gear assembly (66*a*) is controlled by the parallel round trip motion speed control limit switches (71*a*) and (71*b*). Two parallel round trip motion speed amplification springs (72*a*) and (72B) are installed to the inner gear assembly (66*a*), and they are fixed to both sides of the inner gear assembly (66*a*).

The advantage of the HP AMP Design-4 is because the inner gear assembly (66*a*) can be directly driven by the driving motor (62). That feature can make this system much lighter in weight and with one motor it can drive two moment arms and corresponding two generators. (75*a*) is showing the inner gear assembly (66*a*) and the moment arms (67*a*) and (70*a*) are moving left and right. (75*b*) is using the dotted line to show the movement of the inner gear assembly (66*a*).

HP AMP Design-5

Figure 9:
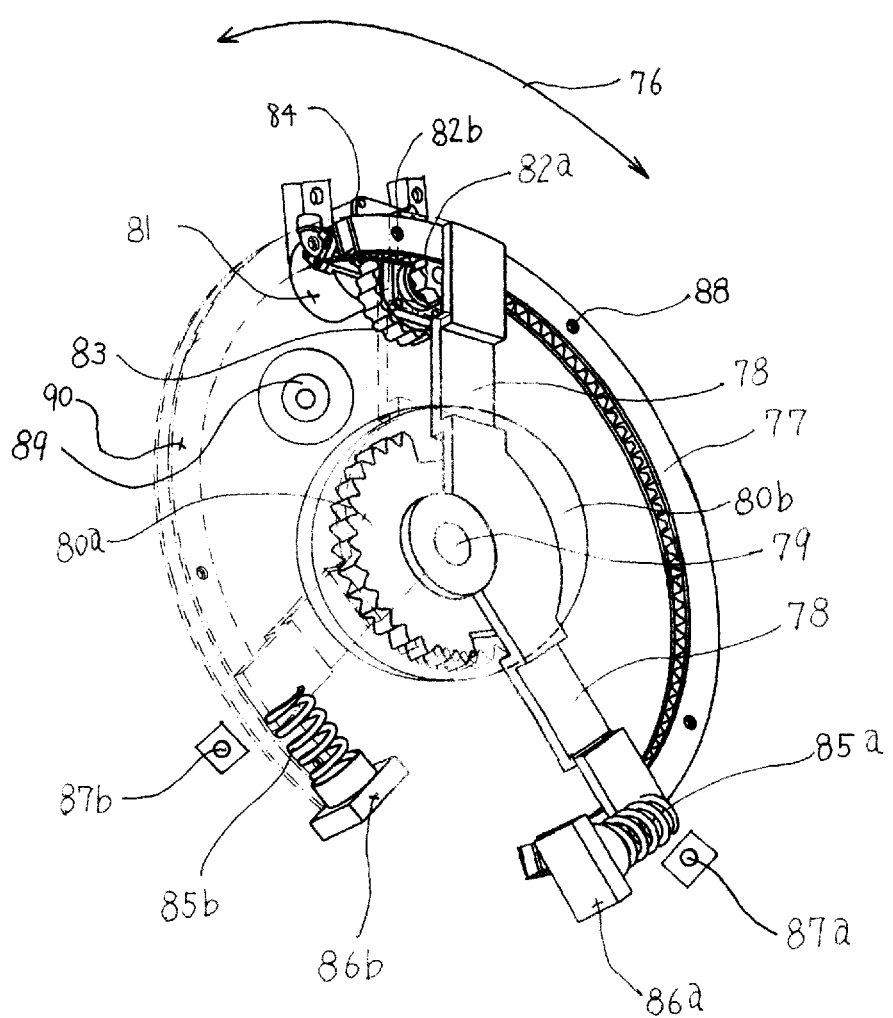
FIG. 9 is a diagram illustrating a HP AMP Design-5 unit. The inner gear assembly (77) of this unit will move same as HP AMP Design-4 (FIG. 8), but has only one moment arm (78) and one generator (89).

As shown in FIG. 9, the HP AMP Design-5 is very similar to the HP AMP Design-2 shown in the FIG. 6. The HP SMP Design-5 uses a motor (81) to drive the W shaped moment arm (78) with its HP amplification mechanism to drive one generator (89). Therefore, the performance of the HP AMP Design-5 is identical to the HP AMP Design-2 with 5.1 times motor HP amplification and a 3 times generator electric power amplification.

The major difference between the HP AMP Design-5 and the HP AMP Design-2 is the inner gear assembly (77) in the HP AMP Design-5 moves in a parallel round trip motion while with HP AMP Design-2; the inner gear assembly (24) is stationary. In HP AMP Design-5, the inner gear assembly (77) moves in a parallel round trip motion with the moment arm (78) following the inner gear assembly (77) to also move with it in a parallel round trip motion. Another difference between the HP AMP Design-5 and the HP AMP Design-2 is on the moment arm design. The HP AMP Design-2 moment arm (19*a*) is using a straight bar shaped moment arm while the HP AMP Design-5 moment arm (78) uses a W shaped moment arm. The benefit of this design is when the HP AMP Design-5 is in operation, the noise is quieter than the HP AMP Design-2.

As shown in FIG. 9, a driving motor (81) is installed to the driving motor installation bracket (84). The inner gear assembly (77) is assembled by the inner gear installation bolt (88). The driving motor (81) will drive the inner gear parallel round trip driving gears (82*a*) and (82*b*), which in tern will drive the speed control gear (83) to control the speed. The parallel round trip motion to rotating motion switching gear (80*a*) and a flywheel (80*b*) are installed on the moment arm (78) and fixed by the supporting shaft (79). In order to make the inner gear assembly (77) to make parallel round trip motion, the W shaped moment arm (78) is installed by the supporting shaft (79). The parallel round trip motion of the inner gear assembly (77) is controlled by the parallel round trip motion speed control limit switches (87*a*) and (87*b*). Two parallel round trip motion speed amplification springs (85*a*) and (85B) are installed to the inner gear assembly (77), and they are fixed to both side of the inner gear assembly (77).

An advantage of the HP AMP Design-5 is because the inner gear assembly (77) can be directly driven by the driving motor (81). That feature can make this system much lighter in weight and with one motor (81) and one moment arm (78) rotate one generator (89). Item (76) shows the inner gear assembly (77) and the moment arm (78) moving left and right. (90) is a dotted line showing the movement of the inner gear assembly (77) and the W shaped moment arm (78).

An Electric Automotive Design Using Two Units of HP AMP Design-4 Devices

Figure 10:
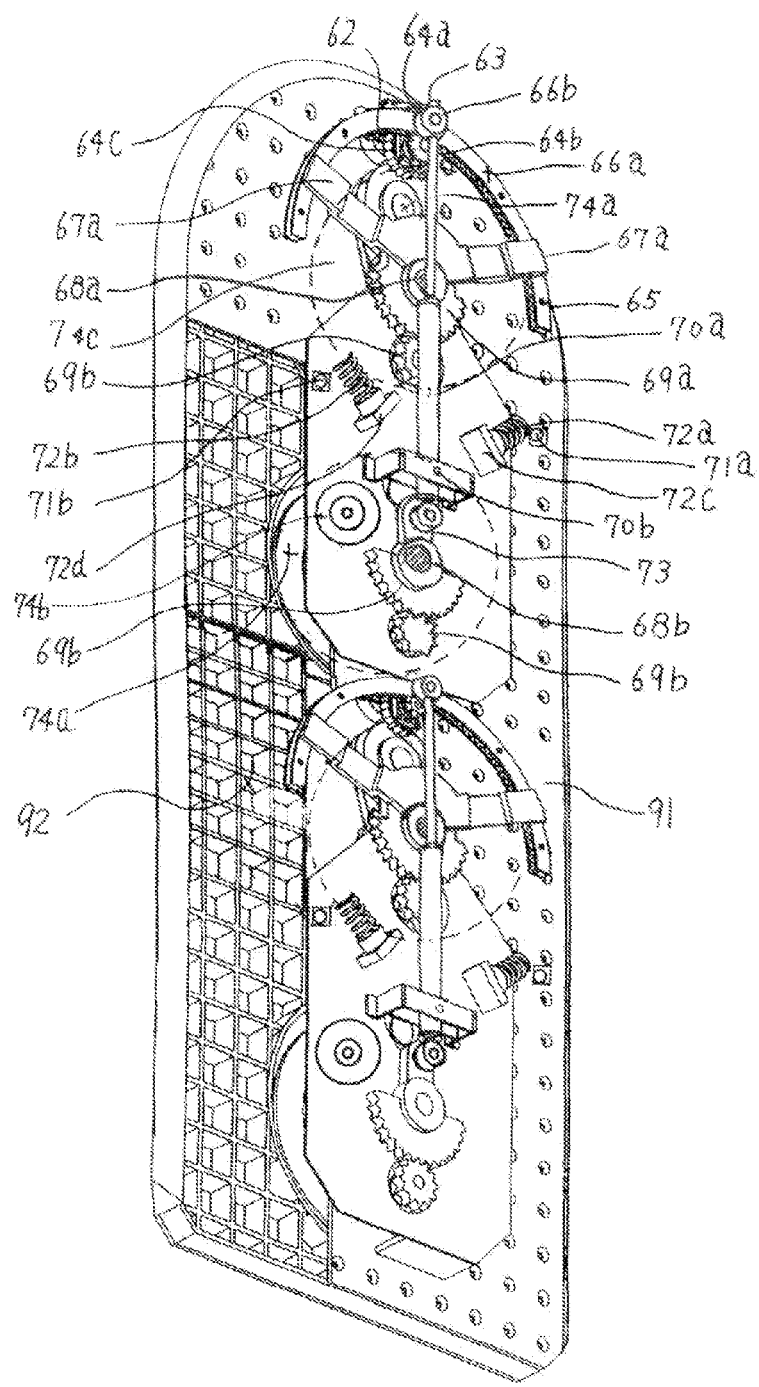
FIG. 10 is a diagram illustrating an electric automotive design using two units of HP AMP Design-4 connected in series electrically.

As shown in FIG. 10, two units of HP AMP Design-4 device are used to form an electric vehicle (also referred to as automotive) system. These two units are installed on the metal square sandwich frame panel (91). A sectional view of the metal square sandwich frame panel (92) is also shown on FIG. 10. With two units in series the second unit can supply a large amount of electricity to power from 150 HP up to 500 HP motors to drive the heavy weight motor vehicles.

Current electric automobiles use a 400 pound 6 foot long battery to power a 150 HP motor to drive the automobile. However, the battery range is only 40 miles, so it requires a gasoline engine to rotate a generator to charge the battery. Using the HP AMP design, the electric automobile does not need such a big battery or the small gas engine. It only needs a small 5.5 KW battery to drive a 7 HP motor in the HP AMP Design-4, unit-1. The 31.5 KW electric output power from the two generators of the HP AMP Design-4 unit-1 will be used to power the HP AMP Design-4, unit-2, charge the 5.5 KW battery and still have 7.25 KW to power all the electric devices in the automotive.

The computation is shown below:

A battery with 5.5 KW is used to drive a 7 HP motor in the HP AMP Design-4, unit-1.

7 HP×0.75 KW=5.25 KW (Only need 5.25 KW to drive a 7 HP motor)

7 HP×5.1=35.7 HP (the motor is amplified 5.1 times by the HP AMP Design-4, unit-1)

35.7 HP/1.7=21 HP (motor HP is converted to generator HP)

21 HP×0.75 KW=15.75 KW (One generator electric power output)

15.75 KW×2=31.5 KW (Two generators connected in parallel)

The 31.5 KW electric power is distributed as follows:
(a) 5.5 KW to recharge the battery.
(b) 18.75 KW will be fed to the HP AMP Design-4, unit-2 to drive a 25 HP motor. (18.75 KW/0.75=25 HP)
(c) Remaining 7.25 KW will be fed to the automotive to power all the electric devices in the automobile.

The horse power of the 25 HP motor in the HP AMP Design-4, unit-2 will be amplified to: 25 HP×5.1=127.5 HP 127.5 HP/1.7=75 HP (Motor HP converted to Generator HP)

75 HP×0.75 KW=56.25 KW (One generator electric power output)

56.25×2=112.5 KW (Two generators connected in parallel)

112.5 KW/075 KW=150 HP (The two generators electric power output can power a 150 HP driving motor to drive the automobile)

An electric automobile using the HP AMP Design-4 will have following benefits:

(A) Only need a 5.5 KW battery and not a 400 pounds, 6 feet long battery costing more than $10,000 battery to drive the electric automotive.
(B) Do not need a small gasoline engine to charge the battery. The generators in the HP AMP Design-4 will charge the battery continuously. It will be operated like a conventional gasoline car. No outside charge will be required.
(C) No gasoline is required, therefore, zero gasoline cost.
(D) No gasoline is burned, therefore, zero air pollution.
(E) We can drive a safer and comfortable full-size automotives, since it does not consume any gasoline.

Figure 11:
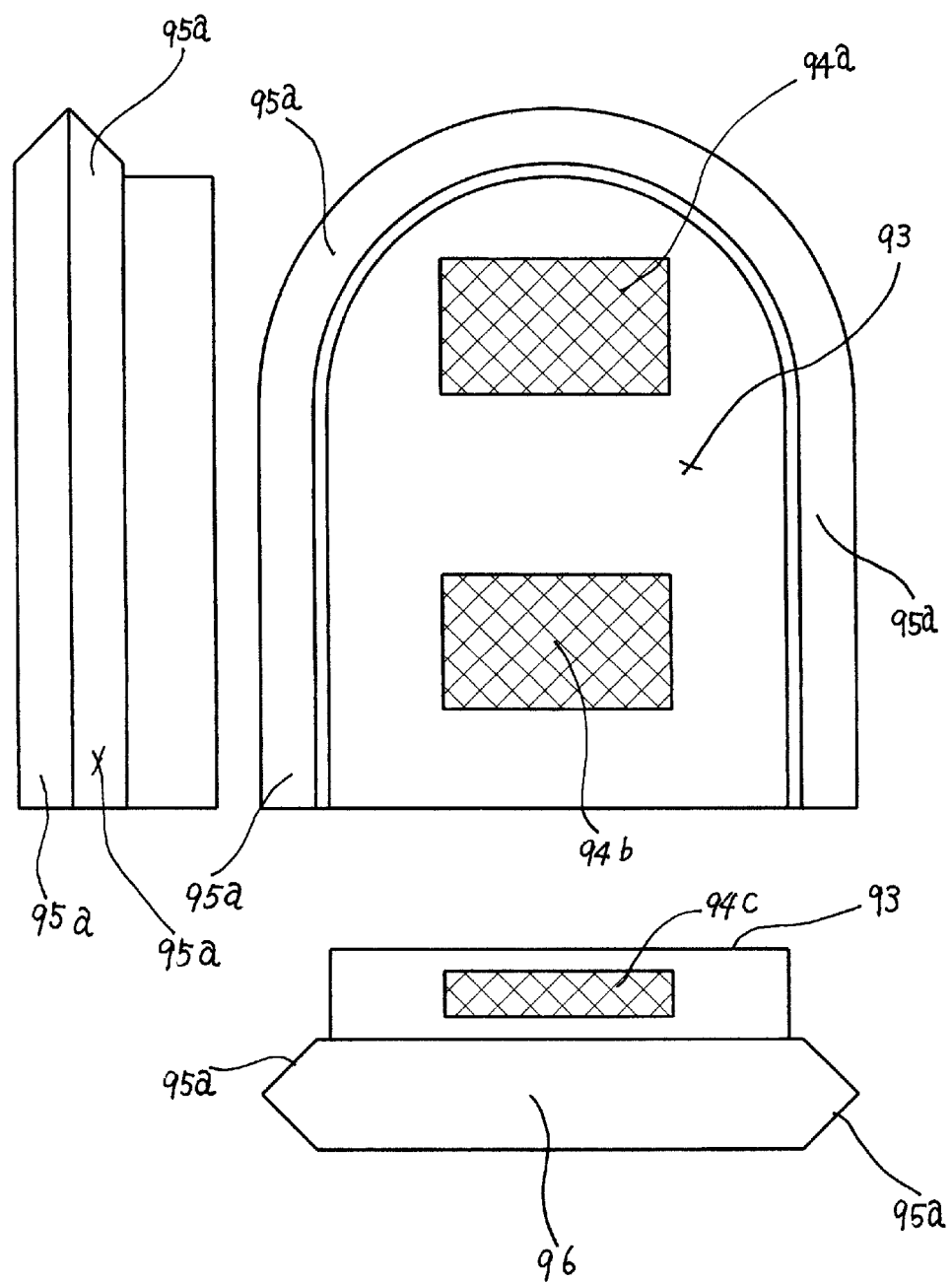
FIG. 11 is a diagram illustrating two HP AMP Design-4 devices are housed in a metal square shaped sandwich frame panel container (96) to be used for electric automotive.

FIG. 11 illustrates two units of HP AMP Design-4 installed into a metal square shaped sandwich frame panel container (96). A metal square sandwich frame cover (93) is also shown. The cover (93) is designed with three metal net air ducts (94a). (94b) and (94c). A metal square sandwich frame car body fixing rail (95a) surrounds the container (96).

Figure 12:
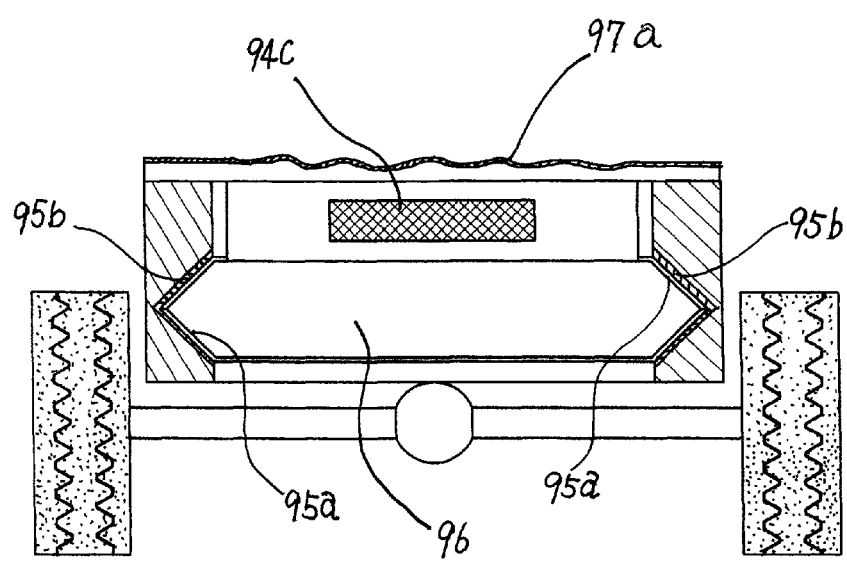
FIG. 12 is a diagram illustrating a rear cutoff sectional view (97a) of an electric automotive device installed on the automotive lower structure.

FIG. 12 is illustrating an automotive rear cutoff sectional view (97a) of a HP AMP electric automotive device container (96) installed on the lower structure of an automotive.

Figure 13:
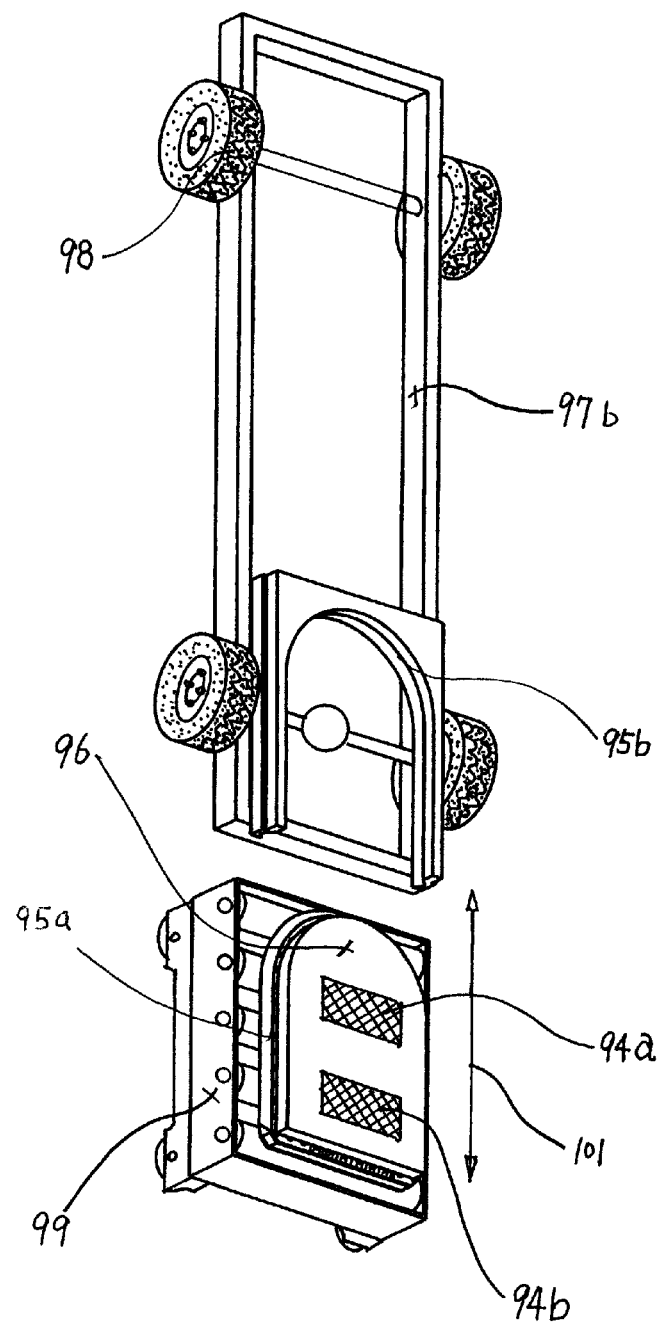
FIG. 13 is a diagram illustrating a device with a lift and roller designed to install the HP AMP electric automotive device (99) is set at the rear chassis of an automotive.

FIG. 13 is illustrating a device with a lift and roller design to install the HP AMP automotive device container (96) into an automotive chassis (97b) of the automotive. Four tires (98) for the automotive are also shown. A metal square sandwich frame fixing rail on the car (95b) will fit nicely with the metal square sandwich frame fixing rail (95a). A special device called lift with roller designed to install the HP amp electric automotive device container (99) is designed to easily install and remove a HP AMP electric automotive device container (96) from the rear of an automotive.

Figure 14:
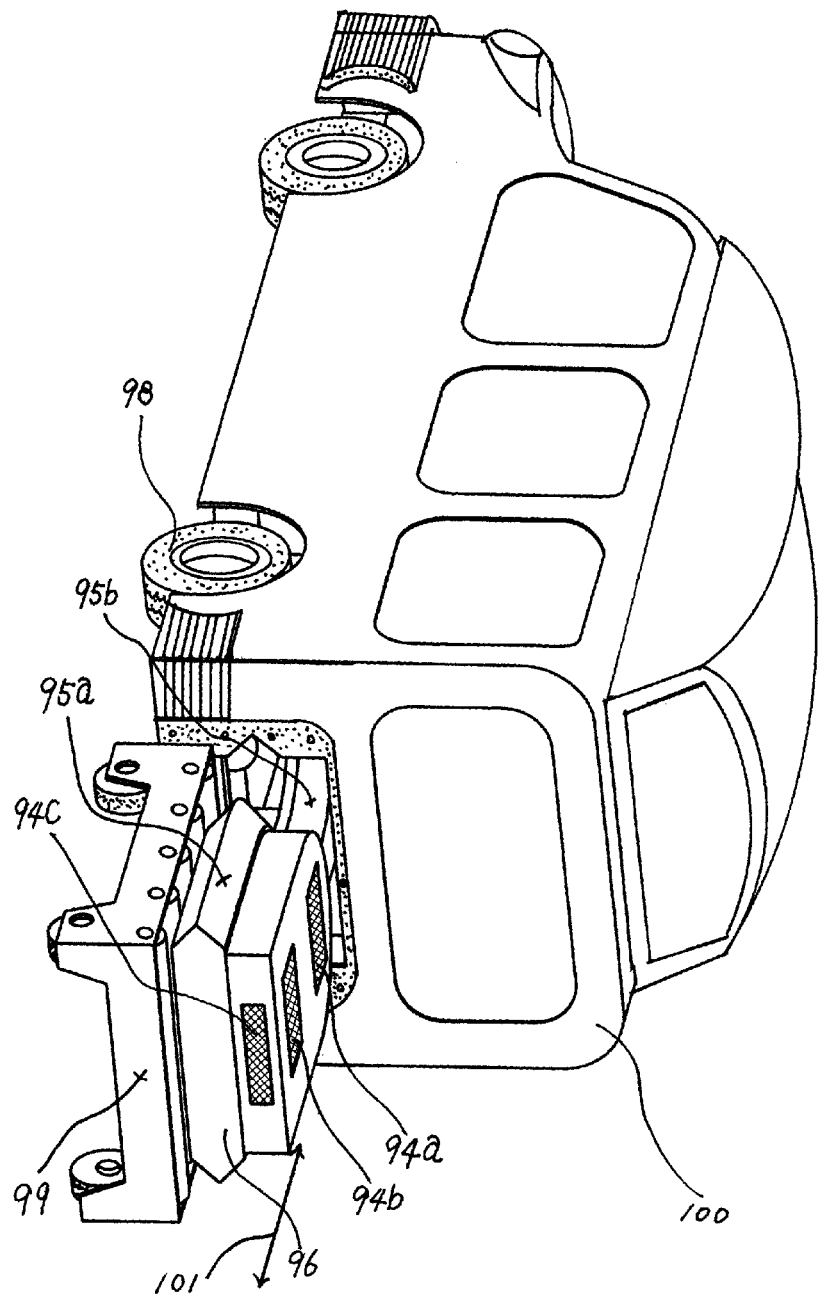
FIG. 14 is a diagram illustrating a device with a lift and roller designed to install the HP AMP electric automotive device (99) is used to install the HP AMP electric automotive device (99) into a rear of an automotive.

FIG. 14 illustrates a HP AMP electric automotive device container (96) being installed by the lift with roller designed to install the HP AMP electric automotive device container (99) into the rear of an automobile (100). The arrow (101) shows the direction the container (96) is moved to be installed or removed from the automobile (100).

Figure 15:
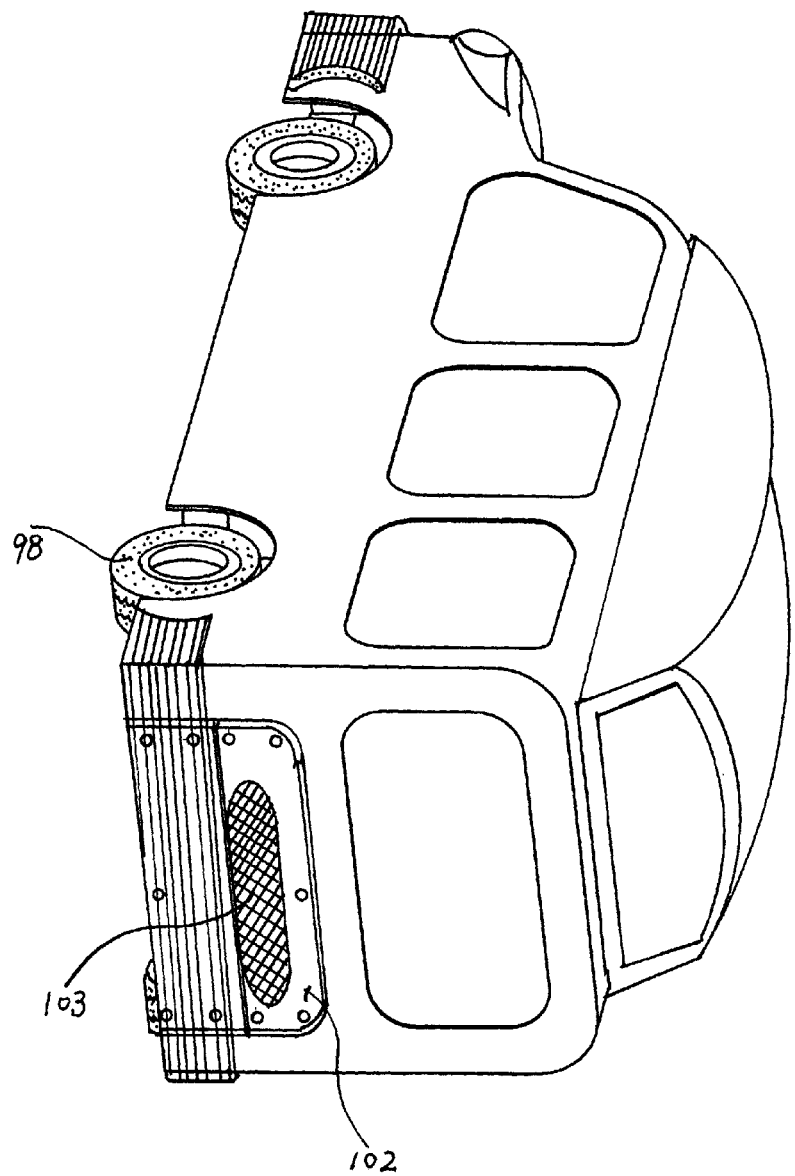
FIG. 15 is a diagram illustrating a rear cover (102) with an air duct (103) is installed on to the rear of the automotive after the HP AMP electric automotive device container (96) is installed into the automotive.

FIG. 15 is illustrating a rear cover (102) with an air duct (103) is installed on to the rear of the automobile after the HP AMP automotive device container (96) is installed into the automobile.

Metal Square Sandwich Frame Panel

The metal square sandwich frame panel (91) can be used for the automotives, ships or as building material. It is very light and can be produced with low cost.

Figure 16A:
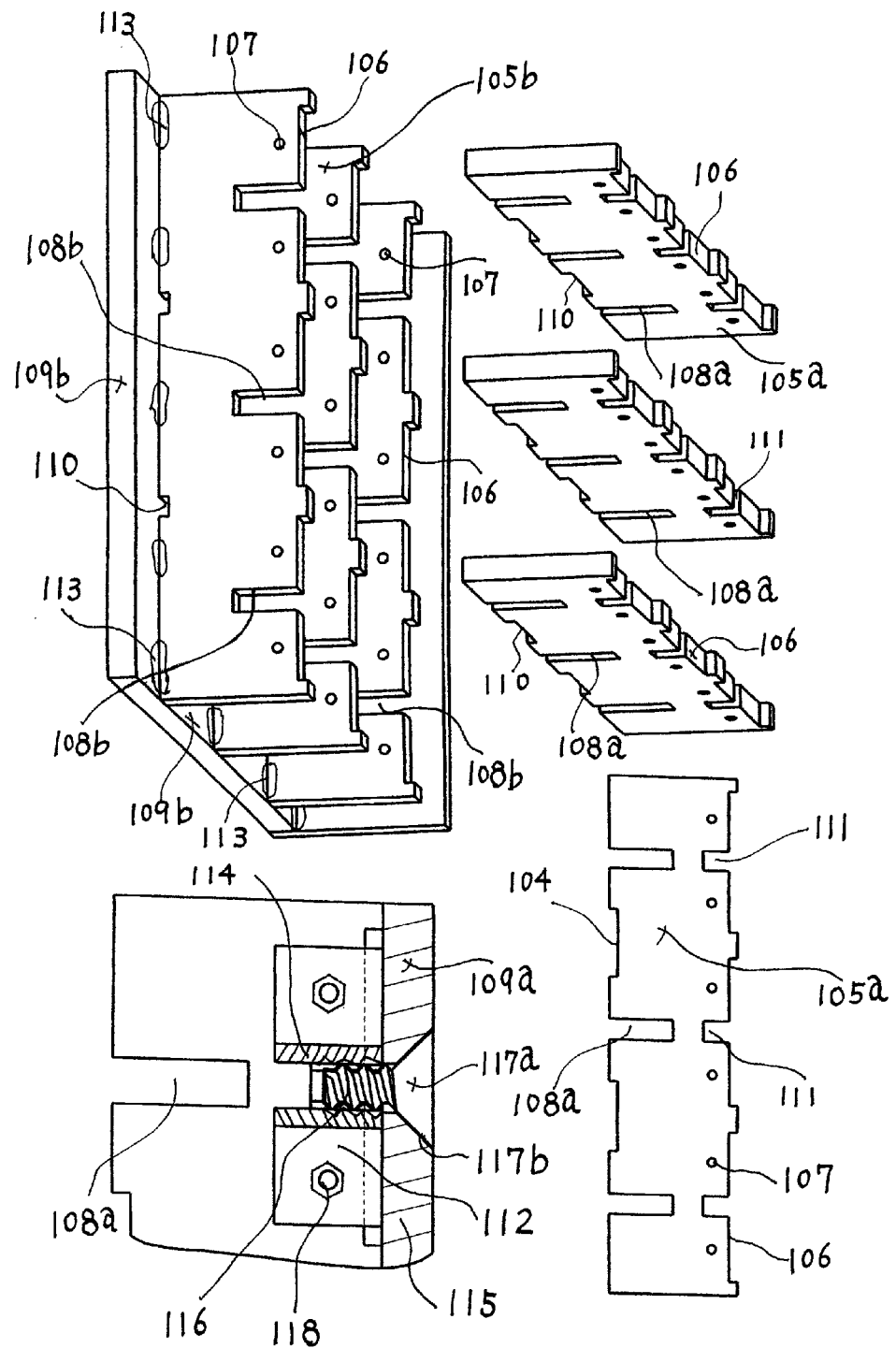
FIG. 16A is a diagram depicting the square shaped frames (105a) and (105b) are produced by a press machine and they are installed to a lower panel (109b) by welding (113). A sectional view of a square shaped panel frame is also shown.

FIG. 16A illustrates a way to manufacture first the square shaped frame (105a) and (105b). Then a gap to install square frame (108), (108b) and upper panel setting screw length selection gaps (111) are cut. Some water leakage or drain holes (104) and (110) are also cut. Cross shaped part fixing position (106) and holes (107) are made. Then the square shaped frames (105a) and (105b) are assembled together at gaps (108a), (108b) and onto the lower panel (109b) using welding (113).

At the left lower corner of the FIG. 16A, the way to install the tightening screw (117a) onto the upper panel screw hole tapered surface (117b) is shown at the upper panel sectional view (115). A material formed as a nut for the bolt (114), a bolt screw side (116), and a cross shaped intersection part fixing bolt/nut (118) is also shown.

Figure 16B:
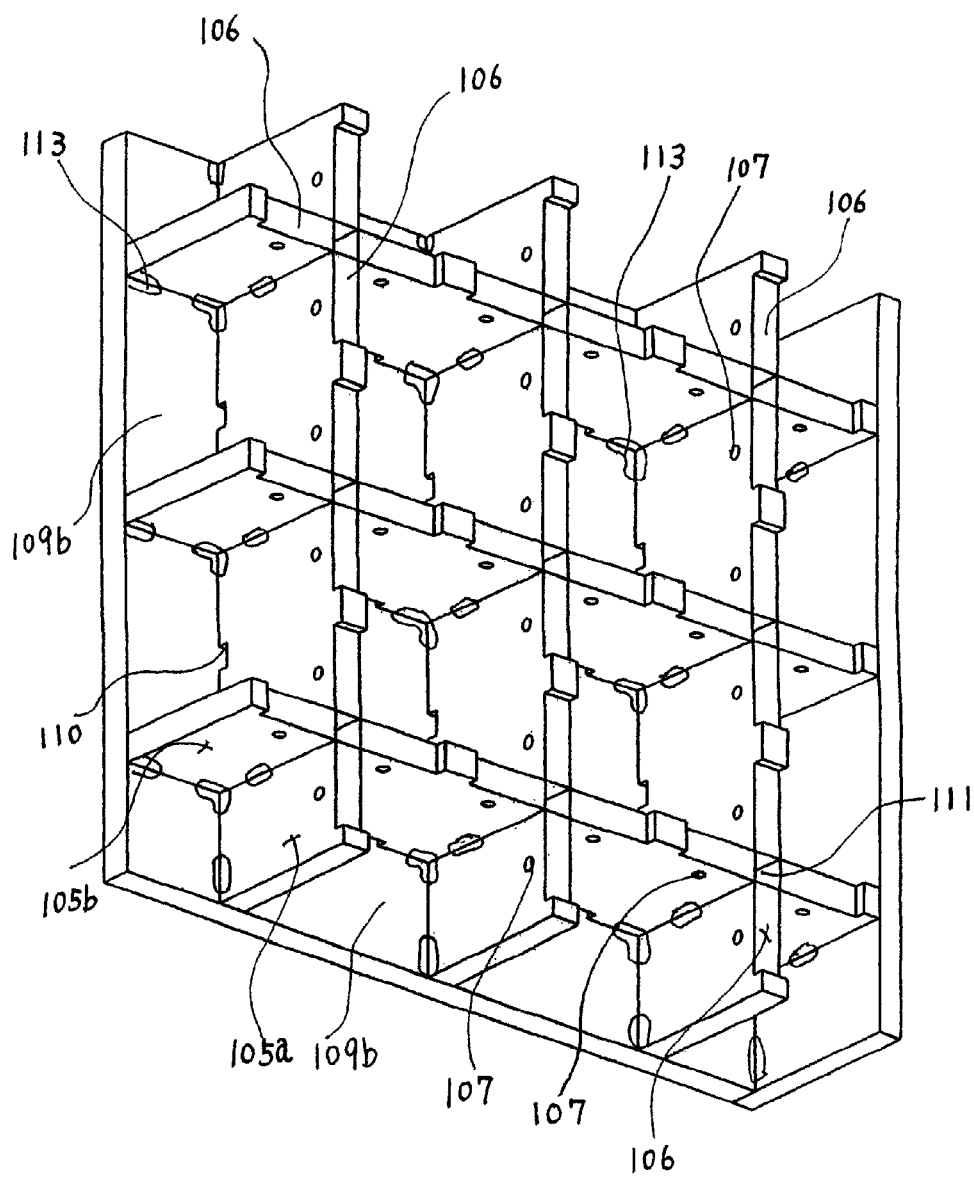
FIG. 16B is a diagram illustrating the square shaped frames (105a) and (105b) are put together and they are welded to the lower panel (109b).

FIG. 16B is illustrating the square shaped frames (105a) and (105b) are assembled and welded to the lower panel (109b).

Figure 16C:
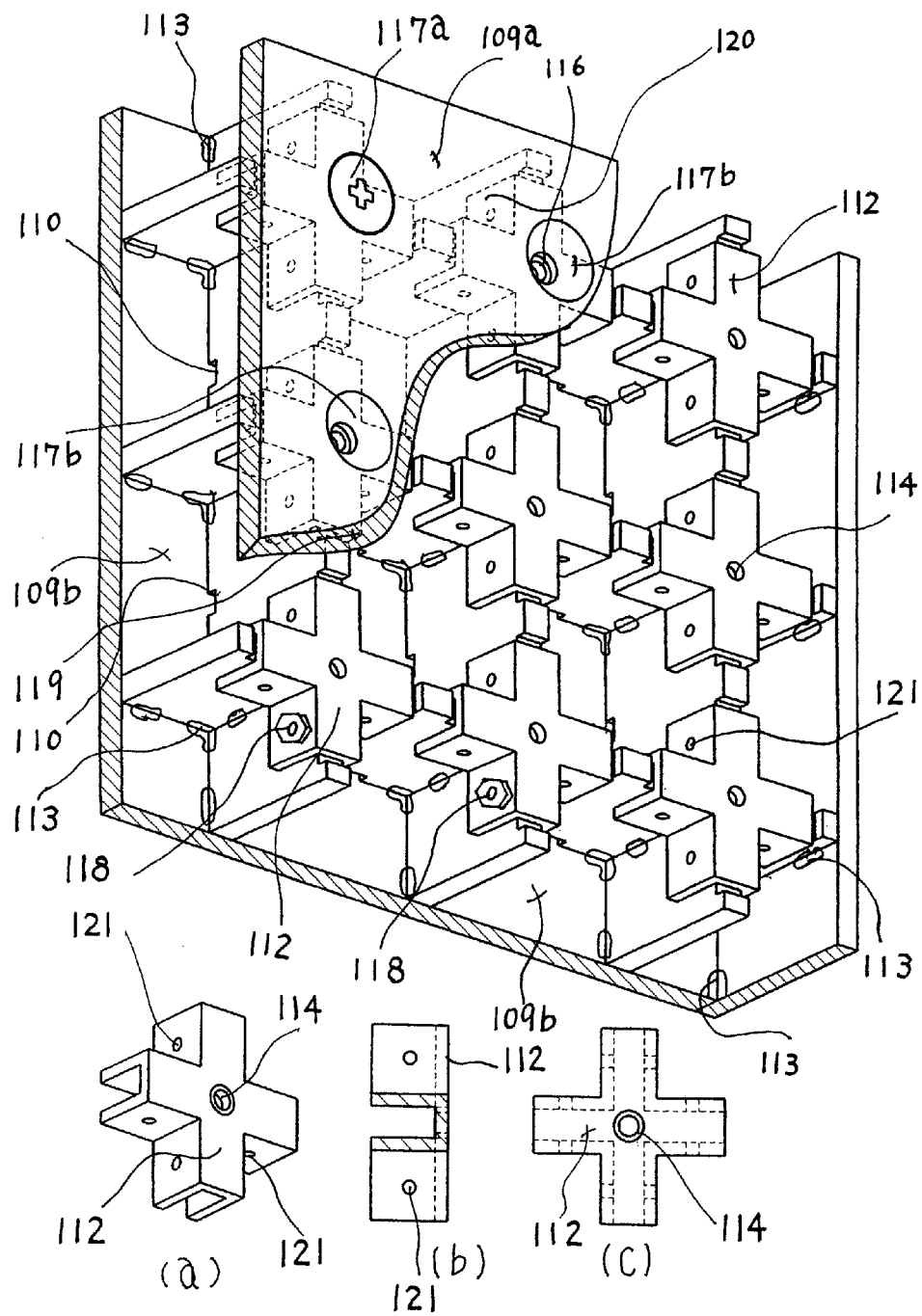
FIG. 16C is a diagram illustrating the cross-shaped intersection fixing parts (112) are installed to the formed (105a), (105b) and (109b) structure, and the cross shaped intersection fixing parts (112) are secured to the structure with a tightening screw (117a) through the upper panel screw hole tapered surface (117b). At the lower part of FIG. 16C, a slanting view (a), a side view (b), and a front view (c) of the cross shaped intersection fixing part (112) are shown.

FIG. 16C is illustrating the cross shaped intersection fixing parts (112) are installed to the assembled square shaped frames (105a) and (105b) and lower panel (109b) structure, and the cross shaped intersection fixing parts (112) are secured to the structure with a tightening screw (117a) through the upper panel screw hole tapered surface (117b). A cutout sectional view of a completed upper panel (119) is also shown. The dotted line shows cross shaped parts are assembled (120). The cross shaped parts installation bolt holes (121) are also shown. At the lower part of FIG. 16C, a slanting view (a), a side view (b) and a front view (c) of the cross shaped intersection fixing part (112) are shown.

Particular features of the metal square shaped frame panel are:

(A) It is light weight.
(B) It can absorb both the strong vibration and noise.
(C) The material can be as thin as 1 mm and can be assemble easily with screws and nuts or welding to make a square shaped frame.
(D) This metal square shaped sandwich frame can be produced inexpensively and be used as a frame or body for the HP AMP automotive devices.

HP AMP Design-3 Prototype Test

In order to demonstrate and test the HP AMP invention concept, a prototype of the HP AMP Design-3 was built and tested.

The following measurement device was used to measure the test result, and the following results were observed.

Measurement device: Torque meter
Name of the maker: ONOSOKUKI
Meter model number: TS-2700
The test highest test result:
Torque=63 Nm (Newton-meter)
RPM=1815 rpm
By calculation:

$$\text{Output HP (in KW)} = T(\text{Nm}) \times \text{RPM (rpm)}/9549$$

The Torque is 63 and the RPM is 1815 (rpm), therefore, $$\text{Output HP} = 63 \times 1815/9549 = 11.97 \text{ KW}$$

$$\text{Horse Power} = 11.97 \text{ KW}/0.75 \text{ KW} = 15.97 \text{ HP}$$

HP amplification ratio=15.97 HP/3 HP=5.32 times.

The design goal for the horse power amplification is 5.1 times but in reality the prototype reached to 5.32 times.

Figure 17:
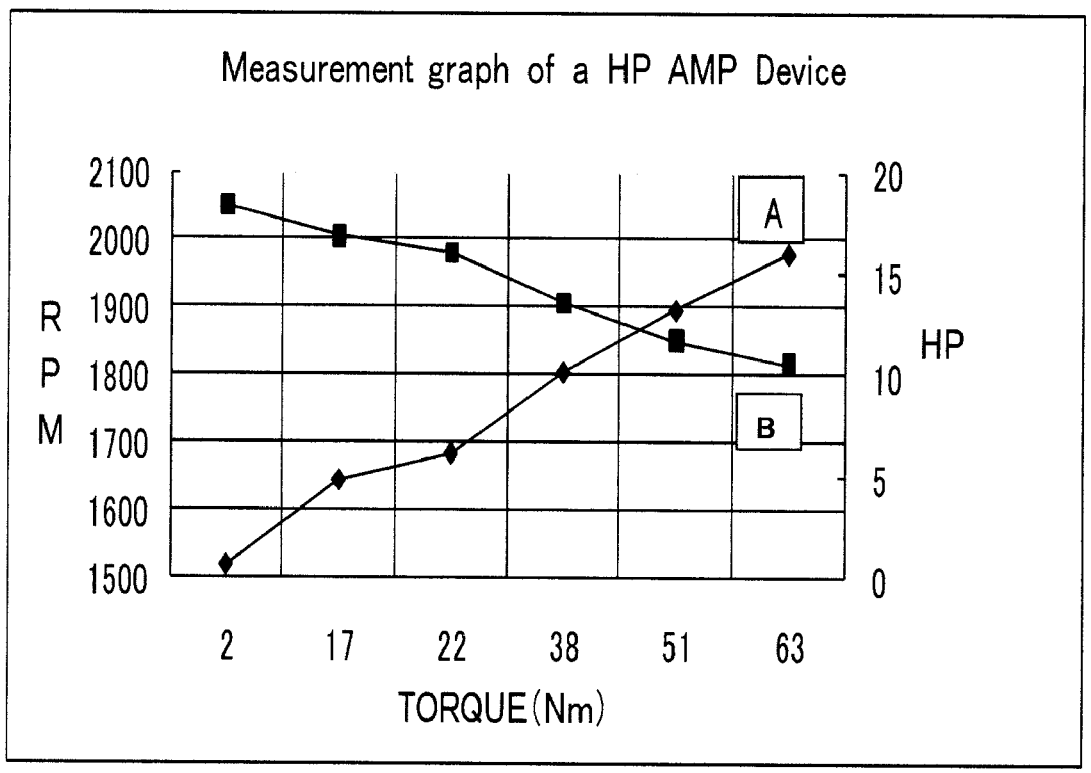
FIG. 17 shows motor horse power amplification test data.

The HP amplification test data and graph are shown in FIG. 17.

The generator output power was also measured. The highest generator output voltage and current are 200 volts and 36 amperes, giving the following calculation:

$$200 \text{ V} \times 36 \text{ A} = 7200 \text{ W or } 7.2 \text{ KW}$$

$$\text{The input power to the motor is 3 HP} \times 0.75 \text{ KW} = 2.25 \text{ KW}$$

$$\text{Electric power amplification ratio} = 7.2 \text{ KW}/2.25 \text{ KW} = 3.2 \text{ times.}$$

Figure 18:
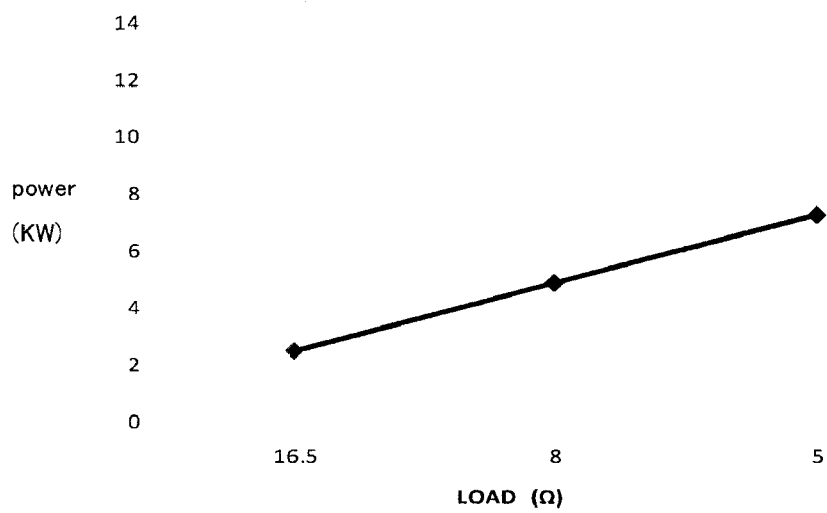
FIG. 18 shows generator output test data.

The design goal for the electric power amplification ratio is 3 times but in the prototype test data it reached to 3.2 times. The generator test result is shown in FIG. 18.

ITEM IDENTIFIERS

1a No. 1 moment arm
1b No. 2 moment arm
1c Parallel round trip motion inner gear
1d Lower parallel round trip motion inner gear restraining panel
1e Upper parallel round trip motion inner gear restraining panel
1f Inner gear assembly
2 Parallel round trip motion input power rotating gear
3a Oil pressure driving motor
3b Oil pressure rubber hose attachment nozzle
4a Parallel round trip motion speed control gear
4b Parallel round trip motion drive gear
5a Parallel round trip motion speed control gear shaft
5b Top portion bearing
6 Inner gear assembly bolt
7a Parallel round trip motion switching limit switch-right
7b Parallel round trip motion switching limit switch-left
8a Parallel round trip motion speed amplification spring
8b Parallel round trip motion speed amplification spring
9a Parallel round trip motion to rotating motion switching gear
9b Parallel round trip motion to rotating motion switching gear
9c Supporting shaft
9d Supporting shaft
9e Supporting shaft
9f No. 2 moment arm supporting shaft
9g Supporting shaft
9h Supporting shaft
10 Generator installation shaft
11a One way clutch speed increasing gear
11b One way clutch speed increasing gear
11c One way clutch speed increasing gear
11d One way clutch speed increasing gear
11e One way clutch speed increasing gear
11f One way clutch speed increasing gear
12a Idle gear
12b Idle gear
12c Bearing
12d Bearing
13a Parallel round trip motion to rotating motion input gear
13b Parallel round trip motion to rotating motion input gear
13c Parallel round trip motion to rotating motion speed increasing gear
14a Generator rotating belt
14b Generator rotating belt
15a Generator
15b Generator
16 Inner gear main body attachment post
17a Flywheel
17b Flywheel
18 Lower frame panel
19a Moment arm
19b Inner gear
20 Parallel round trip motion input power rotating gear
21a Oil pressure driving motor
21b Oil pressure rubber hose installation nozzle
22a Parallel round trip motion speed control gear
22b Parallel round trip motion drive gear
23 Speed control gear shaft
24 Inner gear assembly
25a Parallel round trip motion switching limit switch
25b Parallel round trip motion switching limit switch
26a Parallel round trip motion speed amplification spring—right
26b Parallel round trip motion speed amplification spring—left
27 From Parallel round trip motion to rotating motion changing gear
28a Parallel round trip motion to rotating motion input power gear
28b One way clutch
28c Parallel round trip motion to rotating motion input power gear
28d One way clutch
29a Idle gear
29b Bearing
30 Generator rotation speed increasing gear
31 Generator rotating belt 32 Generator
33 Inner gear supporting post
34 Flywheel
35 Frame panel main body
36 Inner gear assembly bolt
37 Bearing
38a HP AMP Design-2, Unit-1
38b HP AMP Design-2, Unit-2
38c Electrical cable and connecting pipe to connect HP AMP Design-2, Unit-1 to HP AMP Design-2, Unit-2 in series
39 One way clutch
40 Moment arm
41 Slide guide rail
42 Up and down motion chain connection shaft
43 Slide rail installation arm
44 Remote gear
45 Generator
46a Pulley
46b Generator rotating belt
47 Remote gear assembly
48 Flywheel
49 Flywheel speed increasing gear
50 Flywheel rotating shaft
51 Flywheel setting bearing
52 Bearing setting panel
53 Remote gear setting hole
54 Moment arm up and down motion driving motor
55 Moving chain
56 Moving shaft
57 Shaft setting bearing
58 Chain rotation up and down motion sprocket
59 Chain tension adjustment panel
60 A flame to install all parts related to the HP AMP Design-3 device
61a A flame to install generator, flywheel and remote gear
61b An arrow to show the moment arm movement
62 Parallel round trip movement driving motor
63 Driving motor installation bracket
64a Inner gear parallel round trip driving gear
64b Inner gear parallel round trip driving gear
64c Speed control gear
65 Inner gear installation bolt
66a Inner gear assembly
66b Number 2 moment arm installation bearing and shaft
67a Number 1 W shaped moment arm
67b W shaped moment arm installation bolt
68a Supporting shaft
68b Supporting shaft
69a Parallel round trip motion to rotating motion switching gear
69b Parallel round trip motion to rotating motion switching gear
70a No. 2 Extendable cylinder moment arm
70b No. 2 Extendable cylinder moment arm supporting shaft
71a Parallel round trip motion speed control limit switch
71b Parallel round trip motion speed control limit switch
72a Parallel round trip motion speed amplification spring—right
72b Parallel round trip motion speed amplification spring—left
73 Number 2 moment arm parallel round trip motion clank
74a Generator
74b Generator
74c Flywheel
74d Flywheel
75a Showing the inner gear assembly (66a), moment arms (67a) and (70a) are moving left and right
75b Using the dotted line to show the movement of the inner gear assembly (66a)
76 Showing the moment arm HP AMP device moving left and right
77 Inner gear assembly
78 HP AMP moment arm
79 Supporting shaft
80 Parallel round trip motion to rotation motion changing gear
81 Driving motor
82a Parallel round trip motion driving gear
82b Parallel round trip motion driving gear
83 Speed control gear
84 Motor installation bracket
85a Speed amplification spring
85b Speed amplification spring
86a Spring setting bracket
86b Spring setting bracket
87a Parallel round trip motion switching limit switch
87b Parallel round trip motion switching limit switch
88 Inner gear installation bolt
89 Generator
90 Using the dotted line to show the parallel round trip motion
91 Metal square sandwich frame panel
92 A section view of the metal square sandwich frame panel
93 Metal square sandwich frame cover
94a Metal net air duct
94b Metal net air duct
94c Metal net air duct
95a Metal square sandwich frame fixing rail
95b Metal square sandwich frame fixing rail on the car
96 HP AMP electric automotive device container
97a Automotive rear cutoff sectional view
97b Automotive chassis
98 Tire
99 Lift with roller designed to install the HP AMP electric automotive device container
100 Automotive
101 An arrow showing how to install and remove the HP AMP electric automotive device using a roller with lift from the rear of the automotive
102 Rear cover
103 Air duct
104 Water leakage hole
105a Square shaped frame
105b Square shaped frame
106 Cross shaped part fixing position
107 A hole to fix a cross shaped part using bolt/nut
108a A gap to install square frame
108b A gap to install square frame
109a Upper panel
109b Lower panel
110 Water leakage hole
111 Upper panel setting screw length selection gap
112 Cross shaped intersection fixing part
113 Welding surface
114 Material formed as a nut for a bolt
115 Upper panel sectional view
116 Bolt screw side
117a Tightening screw
117b Upper panel screw hole tapered surface
118 Cross shaped intersection part fixing bolt/nut
119 Cutout sectional view of completed upper panel

120 Dotted line shows cross shaped parts assembled
121 Cross shaped parts installation bolt hole All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A power amplification device comprising
a moment arm driven by a motor in reciprocating motion along an arc-shaped path, wherein said moment arm pivots about a pivot point proximal to a pivot end of said moment arm and thereby pivots a switching gear mounted thereon, and wherein said motor drives said moment arm through a linkage with the moment arm distal to said pivot point and distal to said switching gear;

a set of reciprocating-to-rotating motion input gears rotationally linked with said switching gear;

a pair of opposing direction one-way clutches coupled respectively to the input gears and a set of idle gears such that the output from the input gears and the idle gears rotate in the same direction;

a flywheel rotationally coupled with the input gears and the idle gears; and a generator rotationally coupled with the input gears and the idle gears and said flywheel, wherein rotation of said generator generates electricity.

2. A power amplification device, comprising:

a moment arm reciprocating to rotating motion converting assembly which comprises a moment arm comprising a terminal gear section at a first end and a geared drive motor at a second end with a connecting arm therebetween, wherein said moment arm is rotatably mounted at said first end on a mounting shaft;

a fixed curved reciprocating motion gear comprising gear teeth arranged along the curve of said reciprocating motion gear and limit switches at each end thereof, wherein said geared drive motor engages with said curved gear such that rotation of said motor advances said motor along said curved gear causing angular movement of said moment arm until the moment arm trips a limit switch thereby causing reversal of the rotation direction of said motor;

a pair of reciprocating to rotating motion converting gears rotationally coupled with said terminal gear section on said moment arm, wherein said reciprocating to rotating motion converting gears are coupled with a generator drive shaft and together convert the reciprocating motion of said moment arm to uni-directional rotation of said generator drive shaft; and an electrical generator rotationally coupled to said generator drive shaft.

3. The device of claim 2, wherein said generator drive shaft is further coupled with a flywheel which assists in maintaining smooth rotation of said electrical generator.

4. The device of claim 2, further comprising motion reversing assist springs positioned proximal to each end of said curved reciprocating motion gear, wherein said springs assist in reversing direction of motion of said moment arm after said moment arm triggers a limit switch.

5. The device of claim 2, further comprising a second moment arm reciprocating to rotational motion converter, wherein said second converter is coupled to the reciprocating motion of the first moment arm.

6. The device of claim 2, wherein said moment arm reciprocating to rotational motion converter is mounted on a frame.

7. The device of claim 2, wherein said moment arm reciprocates at about 50 to 150 cycles per minute.

8. The device of claim 2, wherein said generator is rotated at about 1500 to 2500 rpm.

9. The device of claim 2, further comprising a second power amplification device, wherein said second power amplification device is electrically coupled in series to the first power amplification device.

10. The device of claim 2, comprising
a drive motor which drives reciprocating arc motion of the first ends of a pair of moment arms which pivot about coaxial pivot points distal from said first ends, wherein the reciprocating arc motion of said moment arms are each rotationally coupled through one-way clutches with a flywheel and respective electrical generators.

11. The device of claim 10, wherein said one-way clutches are located in the pivoting termini of said moment arms.

12. The device of claim 10, wherein said drive motor drives said reciprocating arc motion through a sprocket and chain drive.

13. The device of claim 11, wherein said generator is driven by a pulley and belt assembly from a shaft on which said flywheel is mounted.

* * * * *